US011913708B2

(12) United States Patent
Cheong et al.

(10) Patent No.: US 11,913,708 B2
(45) Date of Patent: Feb. 27, 2024

(54) REFRIGERATOR

(71) Applicant: LG Electronics Inc., Seoul (KR)

(72) Inventors: Minho Cheong, Seoul (KR); Daekil Kang, Seoul (KR); Ohchul Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 17/350,319

(22) Filed: Jun. 17, 2021

(65) Prior Publication Data

US 2021/0396457 A1 Dec. 23, 2021

(30) Foreign Application Priority Data

Jun. 17, 2020 (KR) ........................ 10-2020-0073949

(51) Int. Cl.
*F25D 23/02* (2006.01)
*E05D 11/00* (2006.01)

(52) U.S. Cl.
CPC ........ *F25D 23/028* (2013.01); *E05D 11/0081* (2013.01); *E05Y 2900/31* (2013.01); *F25D 2323/024* (2013.01)

(58) Field of Classification Search
CPC ....... E05D 7/02; E05D 11/0081; E05D 7/081; E05D 11/0054; F25D 2323/022; F25D 23/028; F25D 2400/40; F25D 2323/024; F25D 23/02; F25D 29/005; E05Y 2900/31
See application file for complete search history.

(56) References Cited

U.S. PATENT DOCUMENTS 7,516,515 B2 * 4/2009 Leimkuehler ......... E05D 15/505 16/231
8,721,013 B2 * 5/2014 Gore ....................... F25D 23/00 312/401
10,066,868 B2 * 9/2018 Dolinsek ................... E05D 3/02
(Continued)

FOREIGN PATENT DOCUMENTS

CN 101086194 12/2007
CN 107504749 12/2017
(Continued)

OTHER PUBLICATIONS

Extended European Search Report in European Appln. No. 21180115.4, dated Mar. 30, 2022, 17 pages.
(Continued)

*Primary Examiner* — Hiwot E Tefera
(74) *Attorney, Agent, or Firm* — Fish & Richardson P.C.

(57) ABSTRACT

A refrigerator includes a cabinet, a door, and a hinge connecting the door to an upper surface of the cabinet. The hinge includes a mounting part mounted on the cabinet and a hinge pin inserted into the door. The door includes a door body that has a hinge mounting part and is filled with an insulating material, and a panel assembly mounted on a front surface of the door body. The hinge mounting part is recessed into the door body and receives the hinge inserted at a position spaced apart from the upper end of the door body. A pin mounting hole into which the hinge pin is inserted is formed on a lower surface of the hinge mounting part, and an upper opening through which an electric wire directed into the door passes is formed on an upper surface of the hinge mounting part.

18 Claims, 30 Drawing Sheets

(56) References Cited

U.S. PATENT DOCUMENTS

| | | | | |
|---|---|---|---|---|
| 11,624,548 | B2 * | 4/2023 | Jang | F25D 23/028 312/401 |
| 2005/0217308 | A1 * | 10/2005 | Hwang | F25D 23/028 62/298 |
| 2005/0284159 | A1 * | 12/2005 | Kim | F25D 23/028 62/298 |
| 2006/0017361 | A1 * | 1/2006 | Rendel | E05D 11/0081 312/405 |
| 2006/0064846 | A1 * | 3/2006 | Espindola | E05D 11/0081 16/223 |
| 2010/0231110 | A1 * | 9/2010 | Choi | F25D 23/028 16/382 |
| 2013/0328471 | A1 * | 12/2013 | Gore | F25D 23/028 312/401 |
| 2014/0132144 | A1 * | 5/2014 | Kim | E05D 11/0081 312/405 |
| 2016/0209110 | A1 * | 7/2016 | Cho | F25D 23/062 |
| 2018/0031302 | A1 * | 2/2018 | Park | E05D 11/0054 |
| 2018/0187952 | A1 * | 7/2018 | Lv | E05D 11/0054 |
| 2018/0202706 | A1 * | 7/2018 | Lee | F25D 29/005 |
| 2019/0257571 | A1 * | 8/2019 | Park | F25D 23/02 |
| 2022/0299253 | A1 * | 9/2022 | Fulgham, Jr. | F25D 23/028 |

FOREIGN PATENT DOCUMENTS

| | | | |
|---|---|---|---|
| CN | 109959212 | 7/2019 | |
| DE | 102008021338 | 11/2009 | |
| DE | 212015000209 | 3/2017 | |
| EP | 2426448 | 3/2012 | |
| EP | 2843331 | 3/2015 | |
| EP | 3086061 | 10/2016 | |
| EP | 3096098 | 11/2016 | |
| EP | 3181606 | 6/2017 | |
| JP | 2004085073 | 3/2004 | |
| KR | 1020040049683 | 6/2004 | |
| KR | 20140102808 | 8/2014 | |
| KR | 1020170137565 | 12/2017 | |
| WO | WO2004048730 | 6/2004 | |
| WO | WO-2018043933 A1 * | 3/2018 | E06B 3/70 |

OTHER PUBLICATIONS

Partial European Search Report in European Appln. No. 21180115.4, dated Nov. 18, 2021, 15 pages.

* cited by examiner

REFRIGERATOR

CROSS-REFERENCE TO RELATED APPLICATIONS

The present application claims priority under 35 U.S.C. 119 and 35 U.S.C. 365 to Korean Patent Application No. 10-2020-0073949, filed on Jun. 17, 2020, which is hereby incorporated by reference in its entirety.

BACKGROUND

The present disclosure relates to a refrigerator.

In general, refrigerators are home appliances that allow low-temperature storage of food in an internal storage space that is shielded by a refrigerator door and are configured to store stored foods in an optimal condition by using cold air generated through heat exchange with refrigerant circulating in the refrigeration cycle to cool the interior of the storage space.

As such, refrigerators are gradually becoming larger and multifunctional in accordance with changes in dietary life and high-end products, and refrigerators having various structures and convenience devices in consideration of user convenience are being released.

In addition, structures for varying the outer appearance of the front surface of the door of the refrigerator are being opened in order to harmonize with the environment in which the refrigerator is disposed or with surrounding furniture or home appliances. In addition, the refrigerator may be combined with furniture or home appliances to form a wall surface in a built-in type.

However, in such a structure, when the refrigerator door is opened or closed, interference between the door and furniture disposed adjacently or home appliances such as a refrigerator disposed adjacently may occur, and in order to avoid this, when the gap between furniture or home appliances such as refrigerator is adjusted, there is a problem that the outer appearance thereof is poor due to excessive gap exposure.

In addition, when the gap between furniture or home appliances such as refrigerators is narrowed, the door is not opened by more than 90°, so that it is impossible to pull in and out the storage member inside the refrigerator.

In order to solve this problem, in Korean Patent Laid-Open No. 10-2004-0049683, a refrigerator is disclosed in which a hinge connecting the refrigerator cabinet and the door is composed of a multi-joint hinge made of a combination of a plurality of arms, so that the refrigerator door can be opened without interference with the wall surface.

However, in such a conventional technique, the structure of the hinge is relatively complex, and thus there is a problem in that productivity and manufacturing cost increases. In addition, when an electronic product such as a refrigerator or a wall on the side of the refrigerator protrudes, there is a problem in that the hinge operation trajectory has to increase in proportion thereto, and thus, there is a problem that it is difficult to be applied to various environments. In addition, as the door itself rotates while moving away from the cabinet, there is a problem in that a human body may be caught when opening and closing the door, resulting in a safety accident.

In addition, due to the operating characteristics of the multi-joint hinge, there is a problem that manipulation is relatively poor due to the need for more force when manipulating to open and close the door, and there is a problem that it is virtually impossible to dispose the electric wires and tubes guided to the inside of the door through the hinge.

In addition, when the door is rotatably mounted using a plate-shaped hinge without using a multi-joint hinge, an edge part of the door may interfere with adjacent furniture or home appliances such as refrigerators. In particular, in a case where the thickness of the door is thickened for insulation in the refrigerator, such a problem may be more serious.

In order to solve this problem, in Korean Patent Laid-Open Publication No. 10-2017-0137565, a refrigerator is disclosed in which the front surface of the door of the refrigerator is rounded so that the thickness of the door becomes thin as the door can be closer to the rotation axis of the refrigerator door. In the case of a door having such a structure, it is possible to prevent interference with adjacent furniture of home appliances such as a refrigerator by shortening the length from the rotation axis of the door to the edge.

However, a refrigerator having such a structure has a problem in that the front shape of the refrigerator door is limited only to a curved or inclined shape. In the case of a refrigerator having such a structure, when it is installed in a built-in manner or is installed in combination with neighboring furniture or home appliances, there is a problem in that it is not possible to have a sense of unity of the outer appearance by the front surface of the curved door.

In addition, when the front surface of the refrigerator door is formed in a curved shape, it is relatively complicated and difficult to implement a structure that selectively attaches and detaches the front of the door, and it is difficult to implement a built-in or panel-replaceable refrigerator that is installed to harmonize with neighboring furniture or home appliances.

SUMMARY

An object of an embodiment of the present disclosure is to provide a refrigerator that prevents colliding with adjacent furniture, walls, or home appliances when a front door having a flat shape front surface is opened.

An object of an embodiment of the present disclosure is to provide a refrigerator that prevents interference with neighboring furniture or home appliances when the door is opened and interference when a storage member in the refrigerator is pulled in and out in a refrigerator door structure in which a front panel is detachable.

An object of an embodiment of the present disclosure is to provide a refrigerator in which electric wires are easily disposed toward a door in a state where the diameter of a hinge pin is minimized.

An object of an embodiment of the present disclosure is to provide a refrigerator capable of reinforcing a weak point of strength of an edge portion due to an edge disposition of a door of a hinge pin.

In a refrigerator according to an embodiment of the present disclosure, a hinge for rotatably connecting a door to the cabinet may include a hinge pin axially coupled to the door, and the hinge pin may be located in an edge area formed by a front end and a side end of the hinge mounting parts recessed in the door.

In the refrigerator according to an embodiment of the present disclosure, a hinge pin is disposed so that the door has a rotation radius of the door edge between the adjacent furniture or refrigerator and the cabinet, and in a state where the door is opened by 90°, the door has a thickness so that the extension line of a door gasket and the extension line of the storage member in the refrigerator may be formed to be spaced apart from each other.

In a refrigerator according to an embodiment of the present disclosure, some of the electric wires directed to the door pass through the inside of the hinge pin, and the remaining electric wires are guided to the inside of the door through the upper opening on the upper surface of the hinge mounting part, and the diameter of the hinge pin may be formed smaller than the diameter of the upper opening.

In the refrigerator according to an embodiment of the present disclosure, a hinge mounting part through which a hinge pin passes through an upper cap deco is recessed, and the upper cap deco is coupled by a fastening member which is fastened through a plate-shaped front plate forming a front surface and a side frame forming a front surface, and a side frame forming a side surface of the door, and a plurality of fastening member may be disposed around the hinge mounting part.

A refrigerator according to an embodiment of the present disclosure may include a cabinet configured to form a storage space, a door configured to open and close the storage space, and an upper hinge configured to connect the door and an upper surface of the cabinet and includes a mounting part mounted on the cabinet and a hinge pin inserted into the door to become a rotation axis of the door, in which the door may include a door body having a hinge mounting part on which the upper hinge is mounted and filled with an insulating material therein; and a panel assembly mounted on the front surface of the door body to form a front outer appearance of the door, in which the hinge mounting part may be recessed into the door body so that the upper hinge is inserted at a position spaced apart from the upper end of the door body, a pin mounting hole into which the hinge pin is inserted may be formed on a lower surface of the hinge mounting part, and wherein an upper opening through which an electric wire directed into the door passes may be formed on an upper surface of the hinge mounting part.

A diameter of the upper opening may be formed to be larger than a diameter of the hinge pin.

The hinge pin may be formed in a tube shape with a hollow inside, and another electric wire may be inserted into the door through the hinge pin.

The upper opening and the hinge pin may be disposed at positions facing each other on the same extension line.

The hinge pin may have a diameter of 8 mm.

A hinge cover may be provided above the upper hinge to shield the upper hinge, and an electric wire hole through which the electric wire passes may be formed on an upper surface of the hinge cover corresponding to the upper opening.

An electric wire guide part recessed to communicate with the upper opening may be formed on one surface opposite to the recessed surface of the hinge mounting part, and the opened front surface of the electric wire guide part may be shielded by a sealing cap.

A mounting part boss having a hollow interior and extending downward may be formed in the hinge mounting part, and a hinge bush into which the hinge pin is inserted may be mounted in the hollow of the mounting part boss.

The hinge mounting part may include a rear opening which is opened to the rear of the door body and a side opening which is opened to a side of the hinge body.

The hinge pin may pass through an edge region formed with a front surface and an opened side surface of the hinge mounting part among the lower surface of the mounting part.

The door body may include a front plate forming a front surface of the door body, a door liner spaced apart from the front plate and forming a rear surface of the door, an upper cap deco which forms an upper surface of the door and on which the hinge mounting part is formed, a lower cap deco forming a lower surface of the door and coupled with a lower hinge, and side frames forming both side surfaces of the door and connecting the upper cap deco and the lower cap deco, in which the insulating material may be filled in a closed space formed by the front plate, door liner, upper cap deco, lower cap deco, and side frame.

The hinge mounting part may be formed in a position away from the upper end of the upper cap deco downward and formed to open to the rear and side surfaces of the upper cap deco.

The hinge mounting parts may be formed at both side ends of the upper cap deco, respectively, and the upper hinge may be mounted on one side of the hinge mounting part.

The upper cap deco, the lower cap deco, and the pair of side frames may extend forward to form a panel region in which the panel assembly is received, and a front surface of the hinge mounting part may protrude toward the panel area.

The side frame may include a frame side surface forming the side outer appearance of the door, and a frame front surface extending from the side surface of the frame and including the frame front surface coupled to the front plate and the upper cap deco, in which a front opening may be formed in the front surface of the frame so that the front surface of the hinge mounting part passes therethrough, and a front surface of the hinge mounting part may pass through the front opening and is in contact with the front plate.

A side opening which is opened to expose the opened side surface of the hinge mounting part may be formed on the frame side surface.

A fastening member passing through the side frame, the upper cap deco, and the front plate may be fastened to an upper side of the hinge mounting part.

The upper hinge may have an extension part protruding forward from the mounting part and bending toward a side edge of the hinge mounting part past the front surface of the cabinet and may have the hinge pin which is mounted at an end part of the extension part.

A laterally protruding reinforcing part may protrude from the extension part, and the reinforcing part may be formed to connect the side end of the extension part and the front end of the mounting part further forward than the front surface of the cabinet.

DETAILED DESCRIPTION OF THE EMBODIMENTS

Hereinafter, specific embodiments of the present disclosure will be described in detail together with the drawings. However, the present disclosure cannot be said to be limited to the embodiments in which the spirit of the present disclosure is presented, and other disclosures that are regressive by addition, change, deletion, or the like of other components, or other embodiments included within the spirit scope of the present disclosure can be easily suggested.

Figure 2:
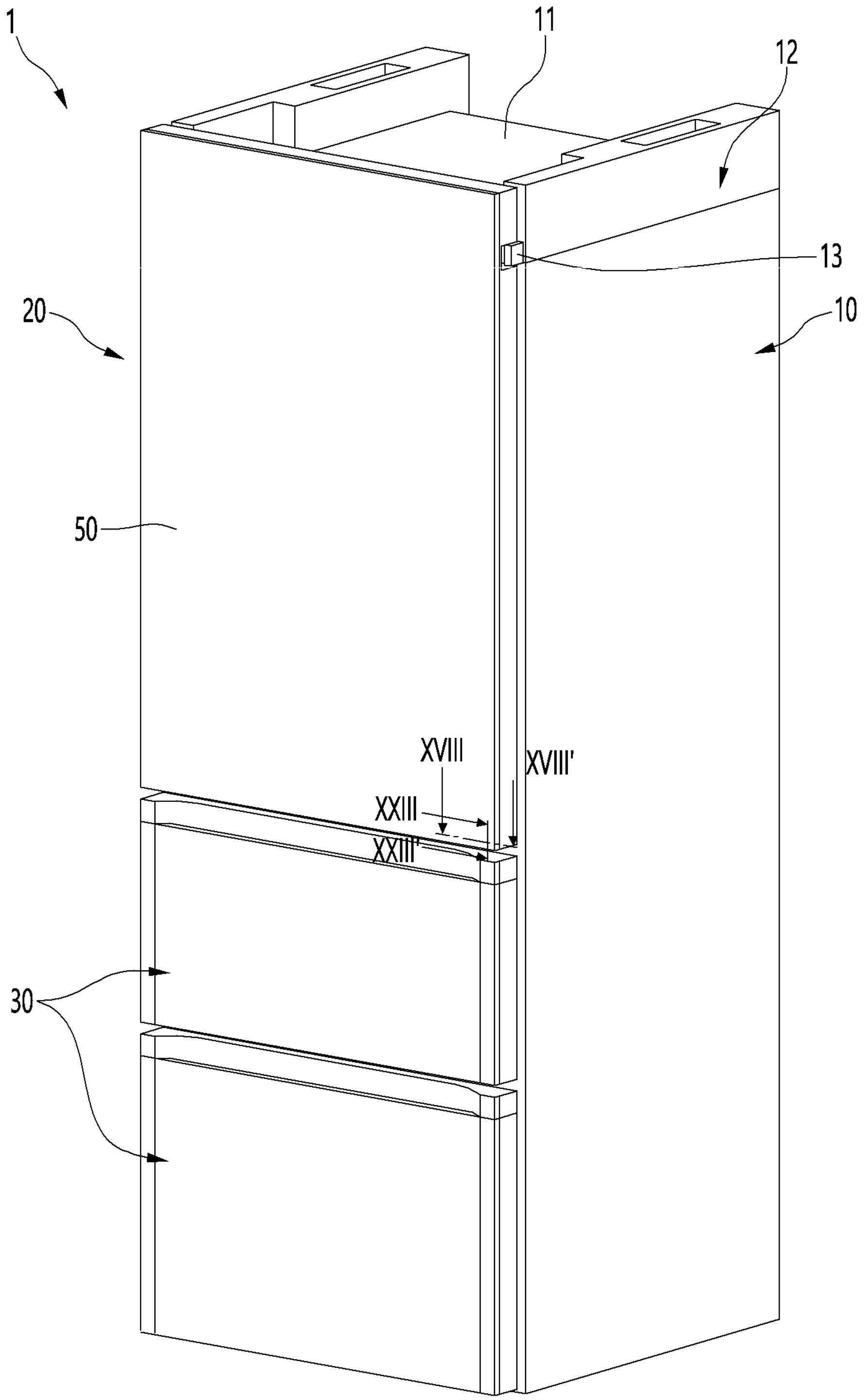
FIG. 2 is a perspective view illustrating the refrigerator.

Define the direction prior to the explanation thereof. According to an embodiment of the present disclosure, the direction toward the front surface of the door as illustrated in FIG. 2 can be defined as front, the direction toward the cabinet with respect to the front surface of the door can be defined as rear, and the direction toward the floor where the refrigerator is installed can be defined as downward, and the direction away from the floor can be defined as upward.

Figure 1:
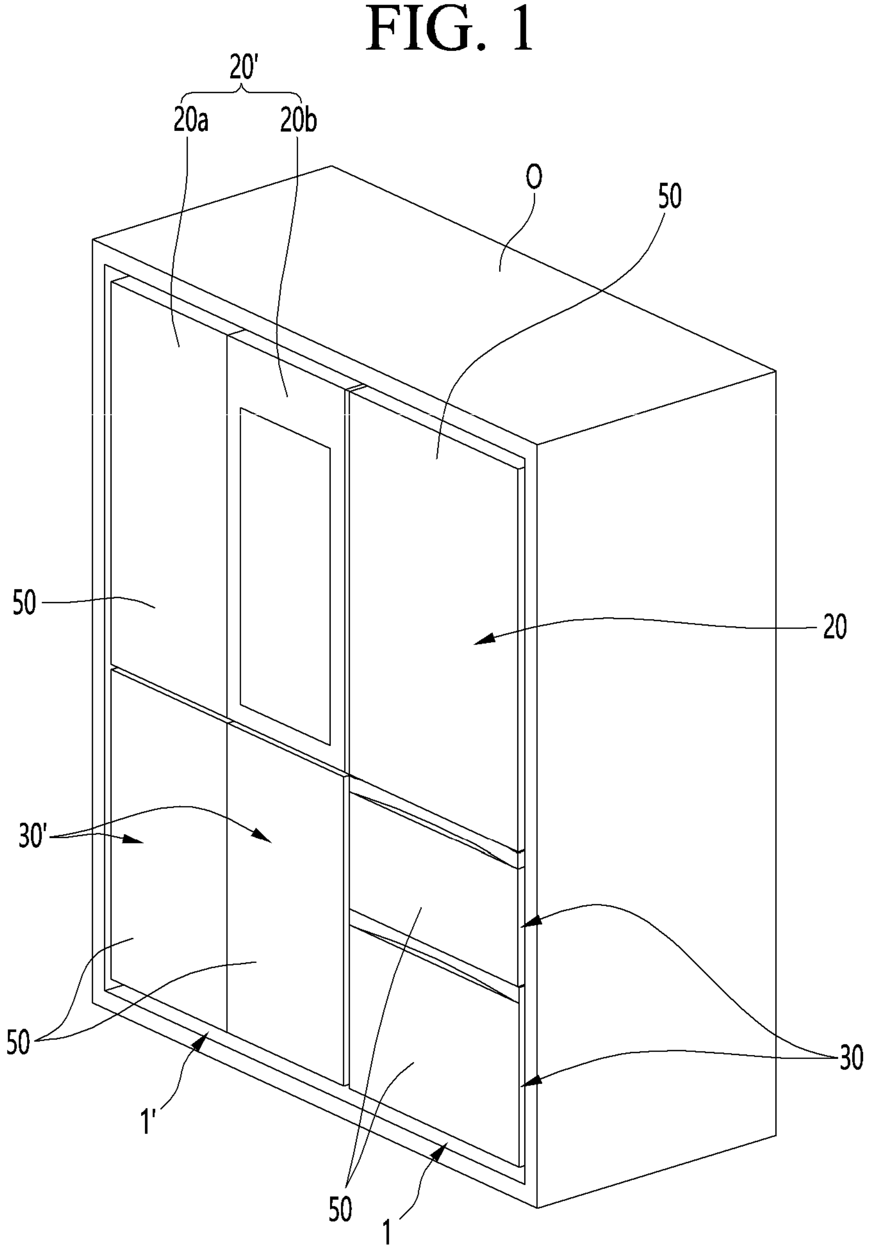
FIG. 1 is a perspective view illustrating a state where a refrigerator according to an embodiment of the present disclosure is installed.

FIG. 1 is a perspective view illustrating a state where a refrigerator according to an embodiment of the present disclosure is installed. In addition, FIG. 2 is a perspective view illustrating the refrigerator.

As illustrated in the drawings, the refrigerator 1 according to the embodiment of the present disclosure has an overall outer appearance provided by a cabinet 10 forming one or more a storage spaces with an opened front surface and doors 20 and 30 opening and closing the one or more storage spaces.

In addition, the refrigerator 1 may be mounted so as to harmonize with the furniture or wall O of the indoor space. For example, as illustrated in FIG. 1, the refrigerator 1 may be installed in an indoor space such as a kitchen and may be disposed adjacent to furniture or a wall O to harmonize. In other words, a space corresponding to the size of the refrigerator 1 may be provided in the furniture or wall O, and the refrigerator 1 may be received or may be disposed in a built-in type therein.

In addition, other refrigerators 1' may be continuously arranged adjacent or side by side or in parallel on the side of the refrigerator 1. In other words, a space in which a plurality of refrigerators 1 and 1' can be disposed may be provided by furniture or a wall O. Although not illustrated, the refrigerator 1 may be further disposed in parallel, and other additional home appliances may be disposed. In addition, the structure and shape of the furniture or wall O are not limited either, and the disposition of the refrigerators 1 and 1' may be provided in various forms. The one or more refrigerators 1 and 1' may be arranged in wall recess.

The plurality of refrigerators 1 and 1' may have the same structure, and refrigerators 1 and 1' having various structures may be disposed in combination as needed. For example, as illustrated in FIG. 1, in the refrigerator 1 disposed on the right side, doors 20 and 30 may be disposed vertically. In other words, the refrigerator 1 on the right may be configured such that a door 20 that is opened and closed in a rotating manner is provided at the upper side, and the door 30 that are opened and closed in a sliding manner are provided at the lower side or vice versa.

In addition, a refrigerator 1' may be further provided on the left side of the refrigerator 1 on the right side. The refrigerator 1' disposed side by side on the left may be configured such that an upper storage space is opened and closed by a pair of doors 20', and a lower storage space is opened and closed by a pair of doors 30'. In addition, the doors 20, 20', and 30' may be configured to open and close in a rotating manner, and these doors 20' and 30' may be referred to as French type doors.

Meanwhile, panel assemblies 50 having the same outer appearance may be mounted on some or all the front surfaces of the doors 20, 30, 20', and 30' of the refrigerator 1 on the right and the refrigerator 1' on the left. Accordingly, when viewed from the front, the overall outer appearance of the refrigerators 1 and 1' may be formed by the plurality of panel assemblies 50. In this case, the front plates 50 of the refrigerators 1 and 1' may have the same structure but only differ in size.

In addition, the refrigerator 1 is disposed adjacent to the adjacent refrigerator 1', furniture, or wall O, and adjacent refrigerator 1', furniture, or walls O within a range that does not interfere when the doors 20, 20', and 30' which are opened and closed by the rotation are operated can be disposed close to minimize the clearance therebetween.

Meanwhile, the same panel assembly 50 may be mounted on the doors 20, 30, 20*a*, and 30' of both the refrigerator 1' on the left and of the refrigerator 1 on the right. The panel assembly 50 forms the front surfaces of the doors 20, 30, 20*a*, and 30', and thus forms the outer appearance of the refrigerators 1 and 1' when viewed from the front. Of course, any one door 20*b* among the doors of the refrigerator 1' on the left has a different outer appearance and may be configured to have an internal perspective function. The other doors 20, 30, 20*a*, and 30', except for the door 20*b* having a specific function, are different in size and shape but may be formed to have the same front outer appearance.

In other words, the doors 20, 30, 20*a*, and 30' of the refrigerators 1 and 1' have different sizes, but the panel assembly 50 having the same structure may be mounted thereon. Accordingly, even if a plurality of refrigerators 1 are disposed, the same appearance, such as color and texture, can be formed. Of course, the panel assemblies 50 may be made of materials having different colors or different textures as necessary.

In addition, since the panel assemblies 50 have a detachable structure, it may be possible to select and mount one having an appropriate outer appearance according to an environment in which the refrigerators 1 and 1' are installed.

In a case where the refrigerator 1 is mounted on the furniture or wall O, the outer appearance of the refrigerator 1 is formed of the same material or a material having the same texture as the furniture or wall O, and the outer appearance of the adjacent furniture or the wall O and the refrigerator may be made to have a sense of unity with each other. Of course, even if the outer appearance of the refrigerator 1 and the furniture or wall O do not have a sense of unity, it would be desirable to be provided with a material that can harmonize.

It is an object to provide distances between the furniture including the refrigerators or other home appliances being uniform and preferably small.

In addition, the refrigerator 1 is disposed adjacent to the adjacent refrigerator 1', furniture, or wall O and can be disposed close to the adjacent refrigerator 1, furniture, or wall O within a range that does not interfere when the doors 20 and 30 are opened or closed.

The structure and mounting structure of the panel assembly 50 of the present disclosure may be the same for both the refrigerator 1' on the left and the refrigerator 1 on the right and therefore, hereinafter, to avoid duplication of description, based on the refrigerator 1 on the right of the refrigerators 1 and 1' of FIG. 1, the structure thereof will be described in more detail.

The refrigerator 1 may have an outer appearance formed by the cabinet 10 and the doors 20 and 30. In addition, the cabinet 10 may form a storage space divided vertically. In addition, the doors 20 and 30 for opening and closing the storage space may be continuously disposed in the vertical direction.

An upper door 20 may be provided in the upper storage space, and a lower door 30 may be provided in the lower storage space. The upper door 20 may open and close the upper storage space by rotation. Accordingly, the upper door 20 may be referred to as a rotary door.

The upper door 20 may further extend upward of the cabinet 10 and may be rotatable by a hinge 13 mounted on the cabinet 10. The hinge 13 may support the upper end of the upper door 20 so as to be rotatable and thus may be referred to as an upper hinge 13. In addition, the lower end of the upper door 20 may be supported by a lower hinge 60 to be described below. Accordingly, the upper door 20 may be rotatably mounted by the upper hinge 13 and the lower hinge 60.

In addition, a control part 11 for controlling the operation of the refrigerator 1 may be provided on an upper surface of the cabinet 10.

The top cover 12 facing the rear surface of the upper door 20 may extend upward at the front end of the upper surface of the cabinet 20.

The lower door 30 may be pushed in and pulled out in a drawer type to open and close the lower storage space.

The lower door 30 may be referred to as a drawer door. The lower door 30 may be provided with an upper and a lower door, and the lower storage space opened and closed by the lower door 30 can consist of one space or also can be partitioned as a space which is opened and closed by one or more lower doors 30.

Meanwhile, the front outer appearances of the upper door 20 and the lower door 30 may be formed by the panel assembly 50. The panel assemblies 50 provided in the upper door 20 and the lower door 30, respectively, are different only in size and may have the same appearance.

Hereinafter, the structure will be described in detail based on the refrigerator 1 on the right for convenience of understanding and explanation, and an embodiment of the present disclosure can be applied not only to the refrigerator 1' on the left with rotating French-type doors 20' and 30' but also to all types of refrigerators that are coupled to the cabinet by a hinge to open and close the storage space in a rotating manner. Therefore, hereinafter, the upper door 20 may be referred to as a door 20.

Figure 3:
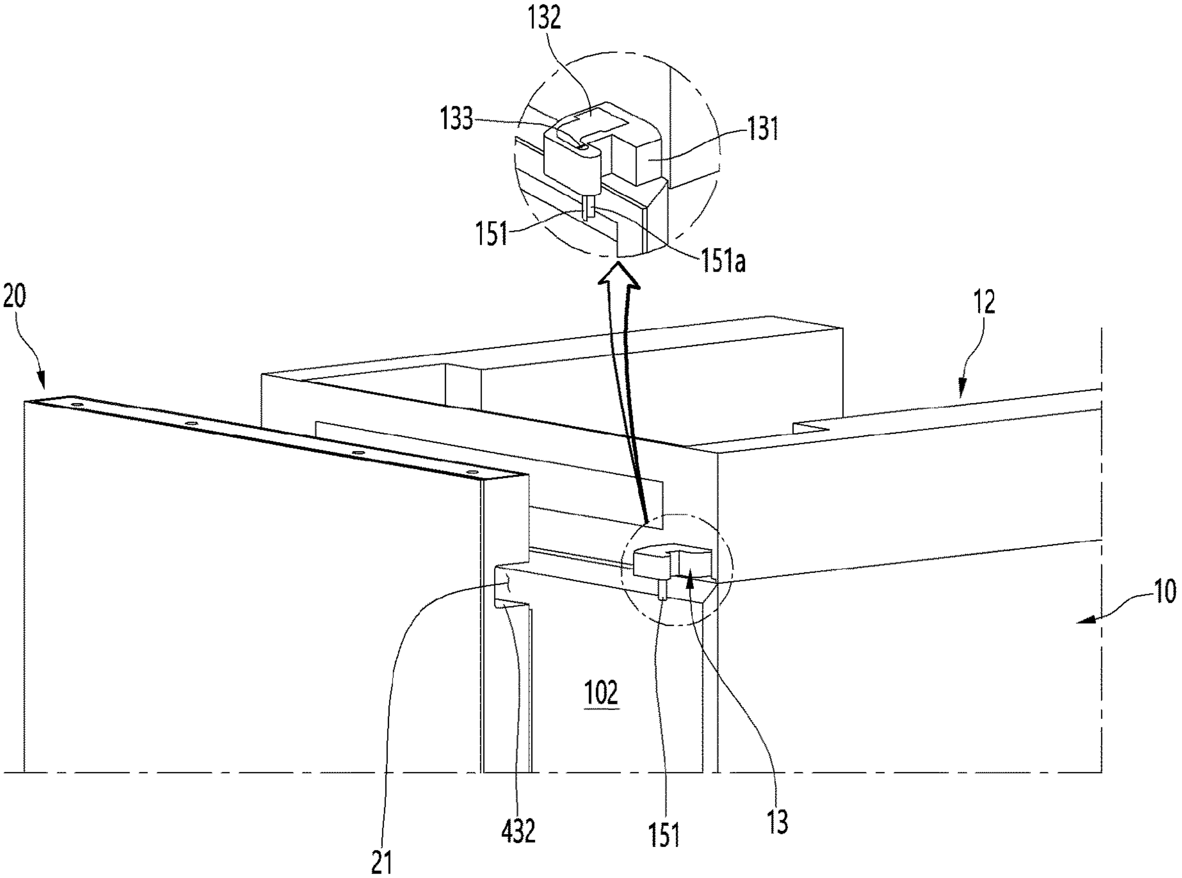
FIG. 3 is an exploded perspective view illustrating a state where the door and the cabinet of the refrigerator are separated from each other.
Figure 4:
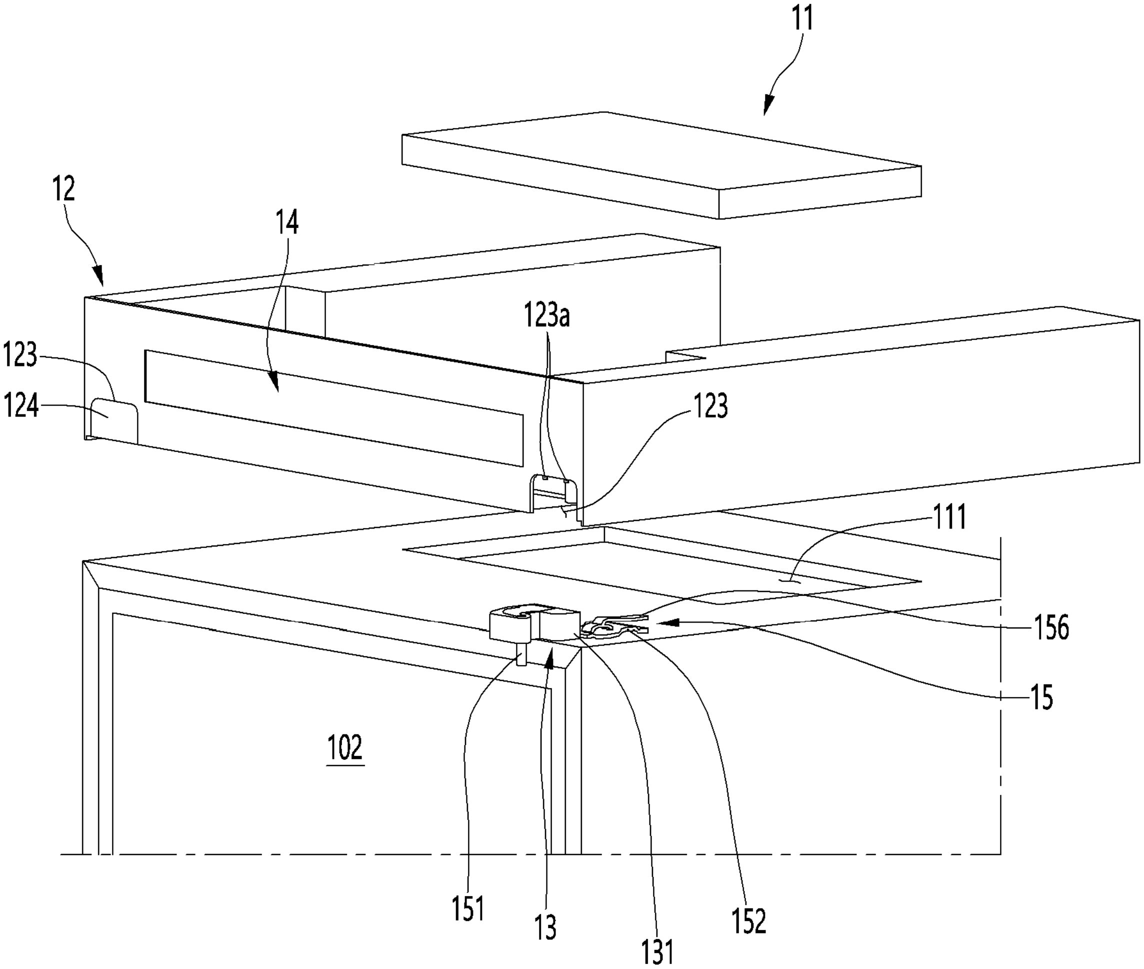
FIG. 4 is an exploded perspective view illustrating a state where the top cover on the upper part of the cabinet is separated.

FIG. 3 is an exploded perspective view illustrating a state where the door and the cabinet of the refrigerator are separated from each other. In addition, FIG. 4 is an exploded perspective view illustrating a state where the top cover on the upper part of the cabinet is separated.

As illustrated in the drawing, an upper end of the door 20 may extend upwardly than an upper surface of the cabinet 10. In this case, the height of the door 20 may be determined by the height of the upper surface of the cabinet 10 but may also be determined by the built-in furniture or wall O.

As illustrated in FIG. 1, in a case where a plurality of refrigerators 1 are disposed, the heights of the doors 20 are all the same, but the height of the cabinet 10 may vary according to the capacity of the cabinet 10. Such a structure can be applied to allow the refrigerators 1 and 1' to fill the space of the furniture or wall O, particularly in a built-in structure. Accordingly, the door 20 may open and close the storage space of the cabinet 10 and form an outer appearance that fills the space of the furniture or wall O in a closed state. Therefore, the height of the door 20 may be formed not the height of the cabinet 10 but the height of a typical furniture cabinet, and the cabinet 10 covered by the door 20 may have various and/or different heights.

Meanwhile, in a case where the height of the refrigerator 1 is higher than the cabinet 10, the hinge 13 provided at the upper end of the cabinet is inserted into and mounted on the hinge mounting part 432 that is recessed from the side surface and the rear surface of the door 20. The hinge mounting part 432 may be formed to correspond to the height of the cabinet 10. The hinge mounting part 432 may be located below the upper edge of the door 20 being spaced apart or away from the upper end by a certain distance. In addition, the hinge mounting part 432 forms a recessed space 21 in which the hinge 13 can be received and is opened to the side surface and the rear surface and is covered by the front surface of the door 20 when viewed from the front and thus becomes invisible.

In addition, the top cover 12 may be located behind the door 20. The top cover 12 may form a surface extending upward from the front surface and left and right surfaces of the cabinet 10 so that the cabinet 10 may look as if the cabinet 10 fills the space in which the refrigerator 1 is installed.

In other words, in a case where the height of the cabinet 10 is lower than the height of the door 20, the space above the actual storage space of the cabinet 10 is exposed forward when the door 20 is opened, resulting in a poor outer appearance. In addition, in a state where the refrigerator 1 is installed, an empty space above the cabinet 10 may be prevented from being exposed through a gap between the furniture or the wall O or the neighboring refrigerator 1'.

The top cover 12 is formed along the front end and both left and right ends of the cabinet 10 from the upper surface of the cabinet 10 and may extend upward to a height corresponding to the height of the door 20.

In addition, the control part 11 may be disposed inside the space formed by the front surface and left and right surfaces of the top cover 12. The control part 11 may be mounted on the recessed part 111 on the upper surface of the cabinet 10. Accordingly, the control part 11 can be prevented from being exposed to the outside by being covered by the front surface and left and right surfaces of the top cover 12.

In addition, a display 14 may be provided on the front surface of the top cover 12. The display 14 is for displaying operation information of the refrigerator 1 and may be exposed to the front surface when the door 20 is opened. Although not illustrated in detail, an operation part operated for controlling the operation of the refrigerator 1 may be further provided on the front surface of the top cover 12 or on the display 14.

The top cover 12 may be formed such that a lower surface thereof is opened to form a space in which electrical components including the display 14 are received. For example, a door switch or a PCB for controlling the operation of the refrigerator 1 may be further provided inside the top cover 12.

In addition, a cover groove 123 in which the hinge 13 is disposed may be formed on the front surface of the top cover 12. The cover groove 123 may be formed at a position corresponding to a position where the hinge 13 is mounted and may be recessed upward from the front lower end of the top cover 12. The cover groove 123 may be configured to correspond to a shape of the hinge cover 131 forming the outer appearance of the hinge 13. Accordingly, in a state where the hinge 13 is mounted, the outer surface of the hinge cover 131 may be coupled to be in close contact with the inner end of the cover groove 123. In addition, a cover protrusion **123*a* may be further formed in the cover groove 123 to be inserted into the hinge cover 131 to couple the top cover 12 and the hinge cover 131**.

Meanwhile, according to the rotation direction of the door 20, the hinge 13 may be mounted on the right side of the upper surface of the cabinet 10 as illustrated, or may be mounted on the left side of the upper surface of the cabinet 10 as needed. If necessary, when a pair of doors are rotatably disposed on both sides, such as the refrigerator 1', the hinges 13 may be provided on both the left and right sides of the upper surface of the cabinet 10.

Accordingly, when the hinge 13 is mounted on the left side, the hinge cover 131 on the left side and a cover groove 123 for mounting may be further formed on the front left side of the top cover 12. In other words, the cover groove 123 may be formed on both the left and right sides of the top cover 12 and may have the same shape as each other. In addition, as illustrated in FIG. 4, in a case where the hinge 13 is disposed only on the right side, the cover groove 123 on the left side may be shielded by the cover 124. The cover 124 may be removed according to the arrangement structure of the hinge 13.

The hinge 13 may include a hinge plate 15 which is mounted on the cabinet 10 to substantially connect the cabinet 10 and the door, and a hinge cover 131 in which the hinge plate 15 is formed to be received therein and which forms the outer appearance of the hinge 13 exposed to the outside.

The hinge plate 15 may be formed of a metal material, and an end portion of the hinge plate 15 may include a hinge pin 151 inserted into the door 20 to become a rotation shaft of the door 20. In addition, the hinge plate 15 may further include a constraining member 156 fastened so as to maintain a state fixedly mounted on the upper surface of the cabinet 10.

Hereinafter, the structure of the hinge 13 will be described in more detail.

Figure 5:
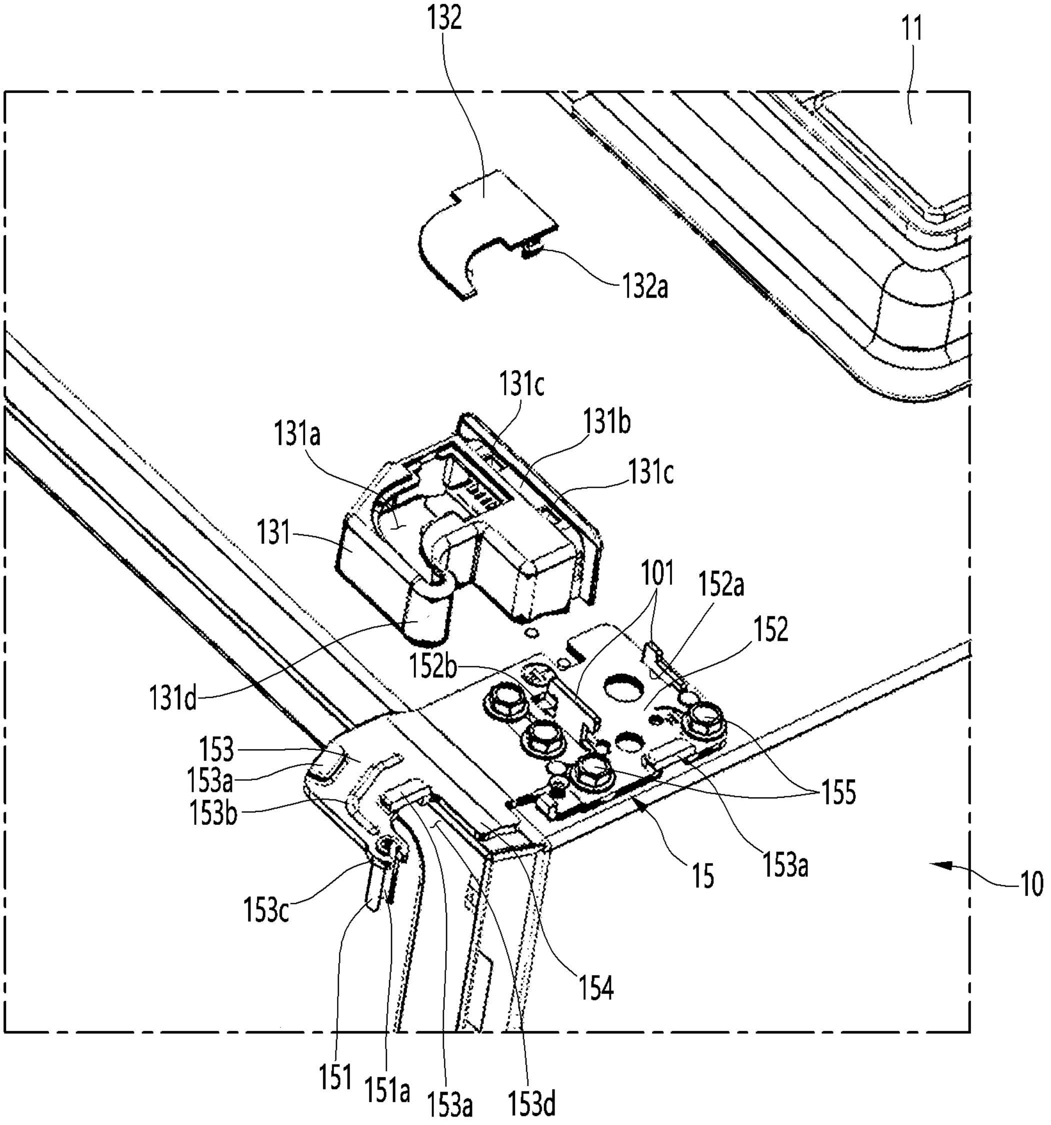
FIG. 5 is an exploded perspective view illustrating a coupling structure between a hinge plate and a hinge cover according to an embodiment of the present disclosure.

FIG. 5 is an exploded perspective view illustrating a coupling structure between a hinge plate and a hinge cover according to an embodiment of the present disclosure.

As illustrated, the hinge 13 may be located at an edge where the front surface and right surfaces of the cabinet 10 meet. In addition, the hinge pin 151 may be extended downward from a position spaced apart to a position where the door 20 is mounted to become a rotation axis of the door 20.

The hinge 13 may be composed of the hinge plate 15 and the hinge cover 131, and the hinge plate 15 may be fixedly mounted on the upper surface of the cabinet 10. However, the hinge cover 131 may be also omitted.

The hinge plate 15 may be formed of a plate-shaped metal material and may include a mounting part 152 disposed on the upper surface of the cabinet, and an extension part 153 which extends from the mounting part 152 and protrudes forward past the front surface of the cabinet 10. In addition, the hinge pin 151 may extend downward at an extended end portion of the extension part 153.

The mounting part 152 may be formed as a whole in a rectangular plate shape, and a constraint groove **152*a* and a constraint hole 152*b* may be formed at the rear end and the center so that the constraining protrusion 101 protruding from the upper surface of the cabinet can pass. In addition, the constraining member 156 illustrated in FIG. 4 is fixed to the upper surface of the mounting part 152 while being fitted to the constraining protrusion 101 to maintain a state where the mounting part 152 is mounted on the cabinet 10**.

The mounting part 152 may be provided with a fastening member 155 that passes through the mounting part 152 and is fastened to the upper surface of the cabinet 10. Screws or bolts may be used as the fastening member 155.

One or more fastening members 155 may be fastened to the mounting part 152. In addition, a cover constraining part **153*a* to which the hinge cover 131 is locked may be further formed at one end of the mounting part 152**.

Meanwhile, the extension part 153 may be formed at a front end of the mounting part 152. The extension part 153 may extend from one end (left end in FIG. 5) of the mounting part 152, extend forward, and then extend laterally (right end in FIG. 5). In other words, the extension part 153 may be formed in a ring shape or an angled or hooked shape in which the recessed portion faces outward.

In detail, the extension part 153 is formed to have a narrower width than the mounting part 152 and may be extended laterally from an end extending forward. In addition, since the hinge pin 151 is positioned at an end portion of the extension part 153 extending laterally, the extension part 153 may be positioned at a position where the hinge pin 151 is set.

The extension part 153 may have a receiving groove 153*d* so that one end of the door 20 in front of the hinge mounting part 432 may be received when the door 20 is opened. The width of the receiving groove 153*d* in the front and rear direction may be slightly larger than the thickness between the front surface of the hinge mounting part 432 and the front surface of the panel assembly 50.

The extension part 153 may be formed to have a sufficient length so that the receiving groove 153*d* can be formed, and the reinforcing part 154 may be formed to protrude to reinforce the strength of the extension part 153 as the extension part 153 becomes longer. The reinforcing part 154 may connect the side end of the extension part 153 and the front end of the mounting part 152 at a position further in front of the front surface of the cabinet 10 and may have a shape protruding laterally based on the extension part 153. In this case, the reinforcing part 154 may be formed so as not to protrude further than the side end of the mounting part 152. Meanwhile, in order to reinforce the strength of the extension part 153, the rear end of the extension part 153 in contact with the mounting part 152 and the rear end of the reinforcement part 154 may be bent upward.

In addition, a reinforcing protrusion 153*b* may be further formed along the extending direction of the extension part 153. The reinforcing protrusion 153*b* may have a shape protruding upward and may be formed by forming. The reinforcing protrusion 153*b* may be disposed in the center along the extended shape of the extension part 153.

Further, cover constraining parts 153*a* to which the hinge cover 131 is locked may be further formed at both side ends of the extension part 153. The cover constraining part 153*a* protrudes upward and opens to the outside so that the cover hook 131*d* mounted on the hinge cover 131 may be fastened.

The extended end portion of the extension part 153 does not extend further outward than the outer end of the mounting part 152, and a pin connection part 153*c* may be formed so that the hinge pin 151 can be press-fitted. The pin connection part 153*c* may be formed in a shape surrounding the hinge pin 151, and one side of the hinge pin 151 may be cut to fix in a press-fitting state.

The hinge pin 151 may be formed to pass through the pin connection part 153*c* and may be formed in a tube shape having a hollow inside. In addition, the hinge pin 151 may be partially cut from the upper end to the lower end and may be coupled in a state of being pressed into the inside of the pin connection part 153*c*. The hinge pin 151 may also be referred to as a hinge pin or a shaft.

The hinge pin 151 may have a hollow part 151*a* to pass through the electric wire L1 guided to the inside of the door. Accordingly, the hinge pin 151 may be formed to have a diameter capable of satisfying the strength capable of supporting the upper door 20 in the state where the hollow part 151*a* is formed.

In particular, the hinge pin 151 should minimize the rotation radius R of the edge of the door 20 in order to prevent interference with the furniture or wall O or home appliances disposed adjacent to the door 20 when opened, and for this reason, the hinge pin 151, which is a rotation axis of the door 20, should be disposed toward the edge of the door 20 as much as possible. The diameter of the hinge pin 151 should be minimized in order to be disposed so as to be as close as possible to the edge of the door 20 while avoiding interference with the internal components of the door 20 at the edge side of the door 20.

In other words, the hinge pin 151 should be able to have a diameter as small as possible, and at the same time, it should be possible to dispose the electric wire L1 inside and to maintain the strength to support the load of the door 20. In order to satisfy these conditions, the hinge pin 151 may satisfy all of these conditions when, for example, a diameter of 8 mm is formed.

Meanwhile, the hinge 13 may include a hinge cover 131 that shields the hinge plate 15 from being exposed to the outside. The hinge cover 131 may be injection-formed of an insulating material, preferably a plastic material.

The hinge plate 15 may be inserted from the lower side by being formed to have an open lower surface.

In addition, the hinge cover 131 may have an open rear surface to communicate with the inner surface of the top cover 12. Accordingly, the electric wires L1 and L2 from the inside of the top cover 12 to the inside of the door 20 may be guided into the hinge cover 131 through the opened rear surface of the hinge cover 131.

As a whole, the hinge cover 131 may block a part of the hinge plate 15 protruding forward by passing through the front surface of the top cover 12. In other words, the hinge cover 131 may be formed in a size and shape in which the extension part 153 can be received, including the front end of the mounting part 152. In addition, the reinforcing part 154 may also be formed to be received inside the hinge cover 131.

In addition, a cover opening 131*a* is formed on an upper surface of the hinge cover 131, and the cover opening 131*a* may be shielded by the sub cover 132. The cover opening 131*a* may be formed to have a size such that a connector connected to the electric wires L1 and L2 inside the hinge cover 131 may be exposed when the sub cover 132 is opened. In other words, in a state where the sub cover 132 open, the connectors provided at the ends of the electric wires L1 and L2 extending from the inside of the door 20 and the electric wires L1 and L2 extending from the cabinet 10 can be connected to be assembled.

The cover opening 131*a* may extend in a region other than the region of the reinforcement part 154. In addition, the cover opening 131*a* may be formed along the upper side of the extension part 153 and may extend to a position vertically above the hinge pin 151.

In this case, the sub cover 132 may be formed to shield only an area of the cover opening 131*a* except for a partial area vertically above the hinge pin 151. Accordingly, an electric wire hole 133 may be formed on the upper surface of the hinge cover 131 in a state where the sub cover 132 is mounted. In other words, the electric wire hole 133 may be formed at the extended end portion of the hinge cover 131 and may be formed on the upper surface of the end portion 131*d* corresponding to the hinge pin 151. In addition, some of the electric wires L1 and L2 directed to the door 20 may enter and exit through the electric wire hole 133.

A sub hook 132*a* protrudes downward from an outer end of the sub cover 132 so that the sub cover 132 is locked around the cover opening 131*a*. Accordingly, the sub cover 132 may be mounted in a state where the cover opening 131*a* is shielded.

A cover fixing groove 131*b* may be formed at a rear end of the hinge cover 131. The cover fixing groove 131*b* may be formed at a position corresponding to the cover groove 123 of the top cover 12, and an end part of the cover groove

123 may be inserted. Accordingly, the top cover 12 and the hinge cover 131 may be coupled to each other so as to have a sense of unity. In addition, a protrusion insertion hole 131*c* into which the cover protrusion 123*a* is inserted may be formed inside the cover fixing groove 131*b*. Accordingly, the hinge cover 131 may maintain a state of being firmly fixed to the top cover 12.

In addition, a cover hook 131*d* that is engaged with the cover constraining part 153*a* may be further formed at a lower end of the hinge cover 131. The cover hook 131*d* may be formed to protrude at a position corresponding to the cover constraining part 153*a*, and the hinge plate 15 may be locked and constrained in the process in which the hinge plate 15 is inserted so as to receive into the inside of the hinge cover 131.

Hereinafter, the structure of the door 20 coupled to the hinge 13 will be described in detail with reference to the drawings.

Figure 6:
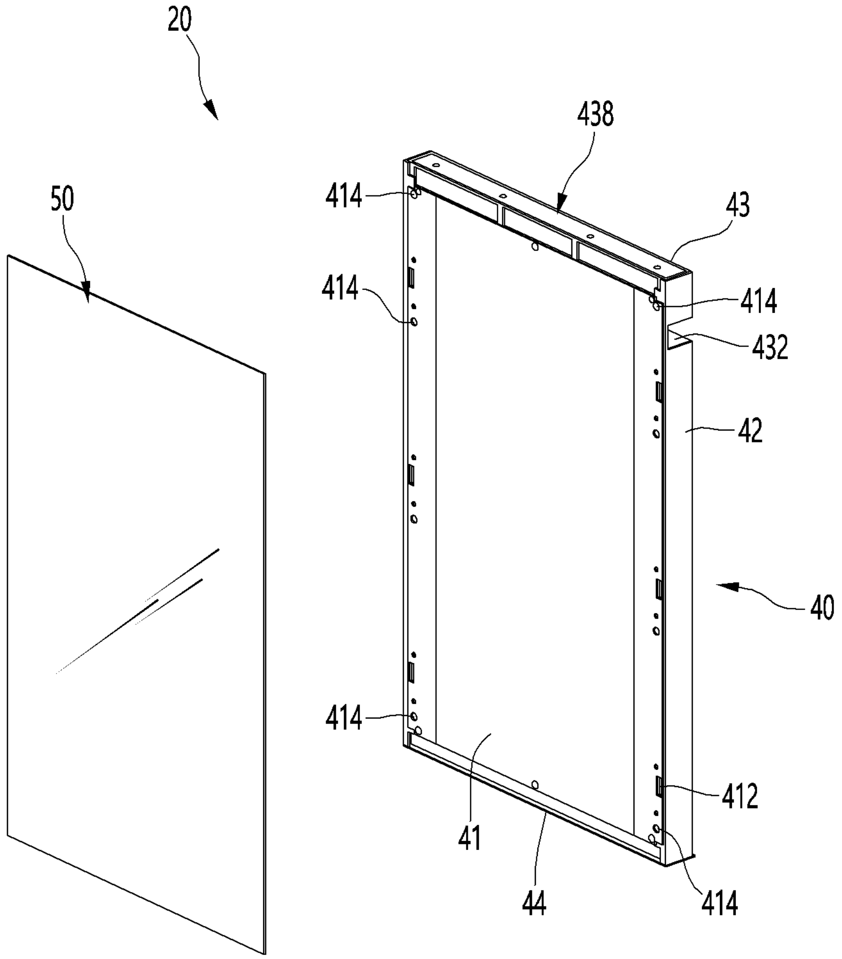
FIG. 6 is an exploded perspective view illustrating the door.
Figure 7:
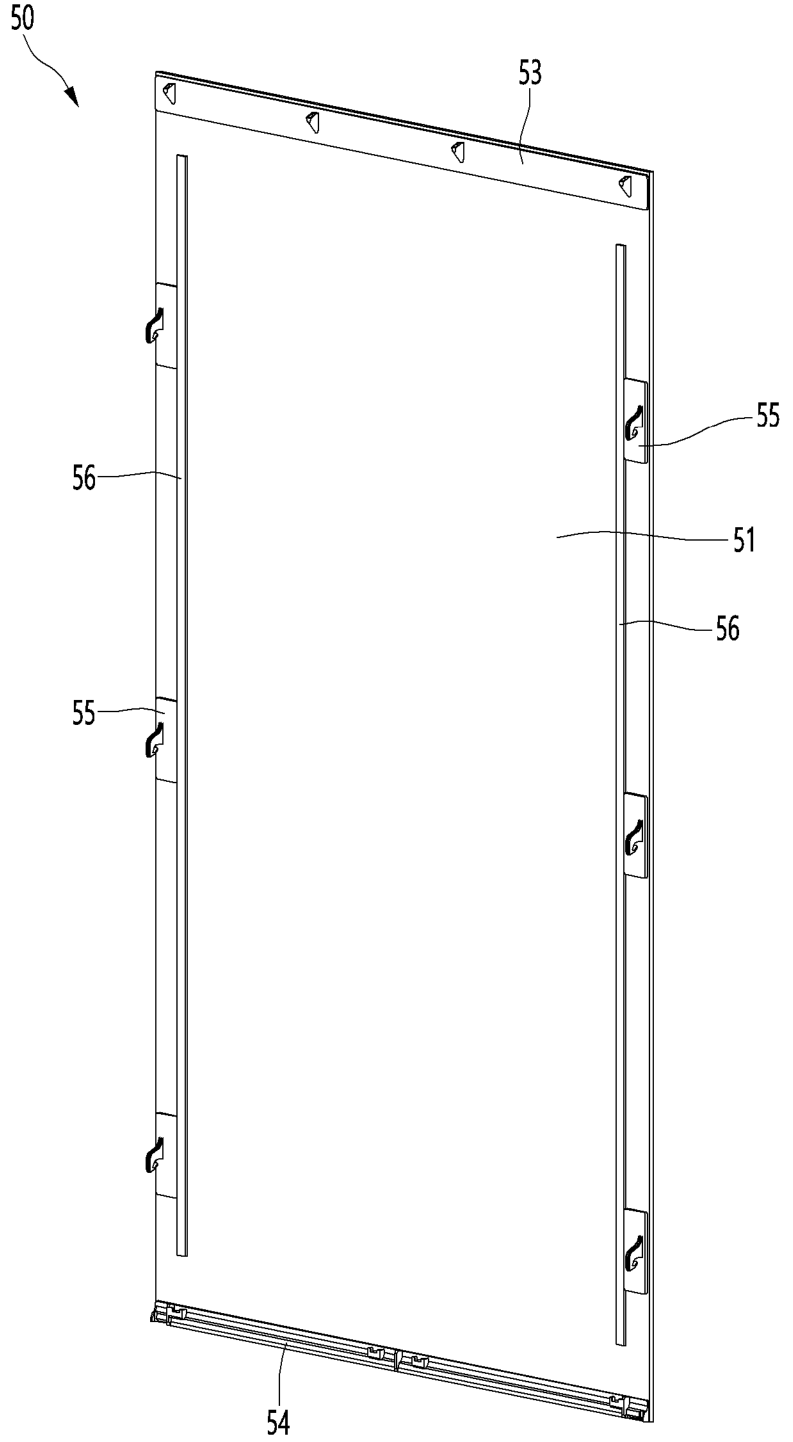
FIG. 7 is a perspective view of a panel assembly, which is a component of the door, viewed from the rear.

FIG. 6 is an exploded perspective view illustrating the door. In addition, FIG. 7 is a perspective view of a panel assembly, which is a component of the door, viewed from the rear.

As illustrated in the drawing, the door 20 is filled with an insulating material 400 and may include the door body 40 that substantially opens and closes the storage space, and a panel assembly 50 that is mounted to the door body 40.

The door body 40 has a predetermined thickness and an insulating material 400 may be filled therein to insulate the storage space. In addition, the panel assembly 50 may be mounted on the front surface of the door body 40 to form the front outer appearance of the door 20 and the refrigerator 1. The panel assembly 50 be mounted to be easily detachable from the door body 40 and may have a structure in which the panel assembly 50 is easily detachable even in a state where the door 20 is mounted on the cabinet 10.

Accordingly, the panel assembly 50 may be mounted in consideration of the outer appearance of the furniture or wall O, and the panel assembly 50 having a design desired by the user may be mounted or replaced if necessary.

The panel assembly 50 has a size corresponding to the front size of the door body 40 and may be configured to form the outer appearance of the entire front surface of the door 20 in a state of being mounted on the door body 40.

The panel assembly 50 may include a plate-shaped panel 51 forming an outer appearance, an upper bracket 53 and a lower bracket 54 for fixing upper and lower ends of the panel 51. In addition, the panel assembly 50 may further include a panel fixing member 55 or a magnet 56 connecting the rear surface of the panel 51 and the front surface of the door body 40 to each other.

In detail, the panel 51 may be formed of a rectangular plate-like material having a predetermined thickness and may be formed of a material that can harmonize with the furniture or wall O or home appliance disposed around it. For example, the panel 51 may be formed of a glass material. For example, the panel 51 may be formed of a tempered glass material and may form the outer appearance of the door 20 by printing or attaching a film to have a color or pattern. In addition, the panel 51 may be formed of a plate-shaped metal material as necessary or may be formed of various materials such as plastic material and acrylic that can be harmonized with the furniture or wall, and other home appliances.

In a state where the panel 51 is mounted on the door body 40, the upper and lower ends of the panel 51 may be supported by the upper support end 431*c* of the upper cap deco 43 and the lower support end 445 of the lower cap deco 44 and the both side ends thereof may be formed to have a size capable of being supported by the side support end 451*a* of the side frame 42. In other words, the panel 51 may have a structure capable of being received inside a space formed by the circumferential surface of the door body 40.

In addition, an upper bracket 53 and a lower bracket 54 may be provided at the upper end and the lower end of the rear surface of the panel 51, respectively. The upper bracket 53 and the lower bracket 54 may be configured such that upper and lower ends of the panel assembly 50 may be fixedly mounted to the door body 40.

The upper bracket 53 and the lower bracket 54 may extend along the upper and lower ends of the panel 51 and may have a length corresponding to the left and right widths of the panel 51. In addition, when the panel assembly 50 is mounted, the upper bracket 53 and the lower bracket 54 may have a structure that is respectively fastened to the upper cap deco 43 and the lower cap deco 44.

Further, a plurality of the panel fixing members 55 may be continuously disposed in the vertical direction along the left and right sides of the rear surface of the panel 51. As an example, the three panel fixing member 55 may be provided on the left surface and the right surface of the panel 51, respectively, and the panel fixing member is provided on the central portion of the panel 51 in the vertical direction, and a portion spaced apart from the central portion in the vertical direction to fix to left and right ends of the panel assembly 50 and the door body 40. Of course, the number of the panel fixing members 55 may be adjustable according to the total length of the panel assembly 50.

In addition, the magnet 56 for assisting the mounting of the panel assembly 50 may be provided on the rear surface of the panel 51. The magnet 56 may be elongated in the vertical direction and may be extended in the vertical direction along the side end of the panel fixing member 55. In addition, the pair of magnets 56 may be provided on both left and right sides.

One surface of the magnet 56 may be attached to the rear surface of the panel 51, and the other surface may be attached to the front plate 41 by magnetic force when the panel assembly 50 is mounted on the door body 40.

Meanwhile, the thickness of the magnet 56 may be formed to correspond to a distance between the rear surface of the panel 51 and the front surface of the front panel 51 when the panel assembly 50 is mounted.

Magnetic force may be applied to the panel assembly 50 and the front plate 41 in an attracting direction by the magnet 56, and thus the panel assembly 50 may maintain a state of being attached to a front surface of the door body 40.

Any one of the fixing member 55 and the magnet 56 may be provided or may be omitted as necessary.

As such, the panel assembly 50 may be fixedly mounted on the front surface of the door body 40, and in the mounted state, the circumferential surface of the panel assembly 50 can be supported by the protruding circumferential surface of the door body 40.

In addition, a space in which the panel assembly 50 can be received and mounted may be formed on the front surface of the door body 40, and the panel assembly 50 may be detachably disposed. The space of the door body 40 in which the panel assembly 50 is disposed is not filled with the insulating material 400, so it can be referred to as a non-insulating space and since the panel assembly 50 is mounted on the space and the space is located in front of the space where the insulating material 400 is placed, the space can also be called a front space.

Hereinafter, the structure of the door body 40 will be described in more detail with reference to the drawings.

Figure 8:
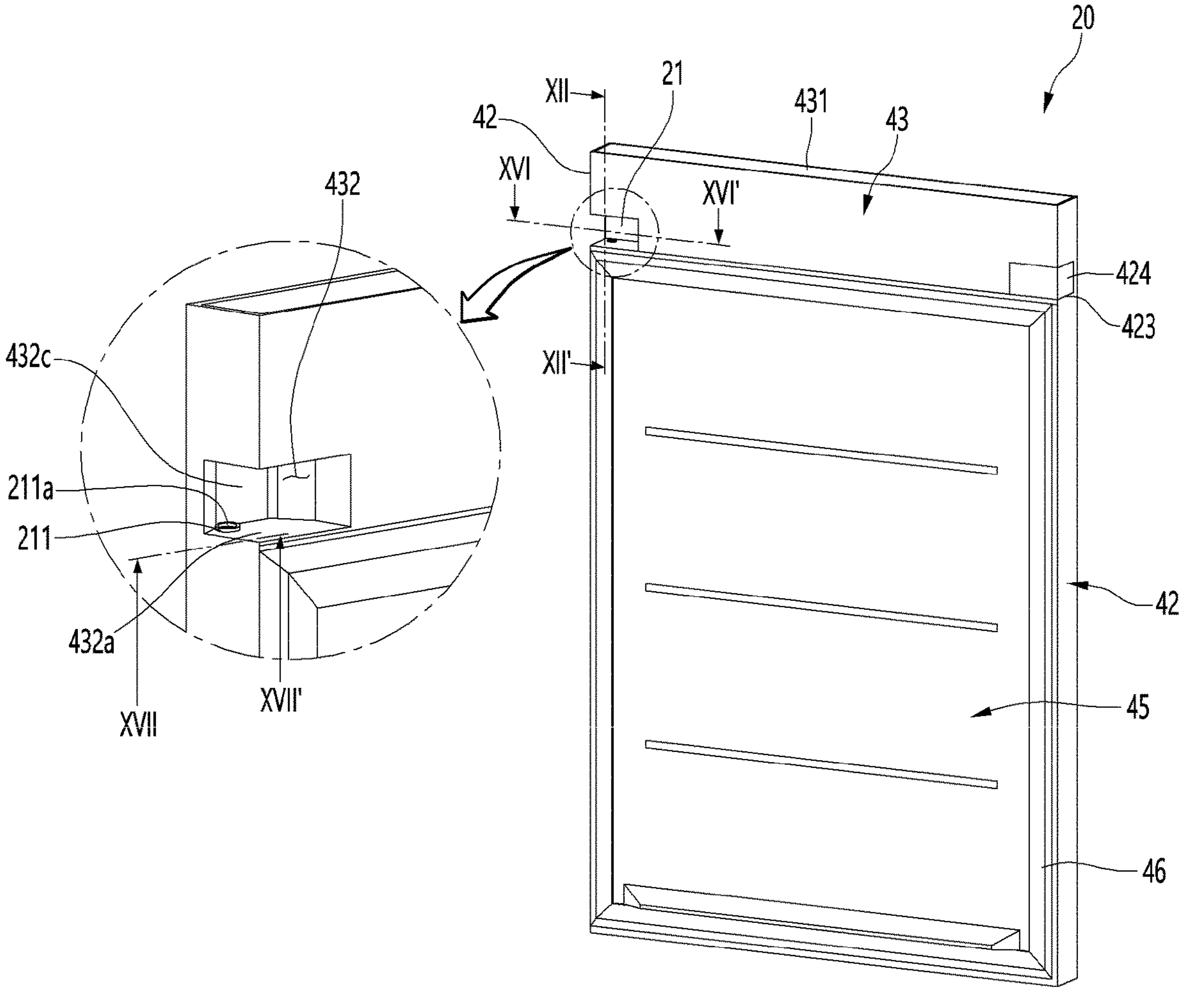
FIG. 8 is a perspective view of the door viewed from the rear.
Figure 9:
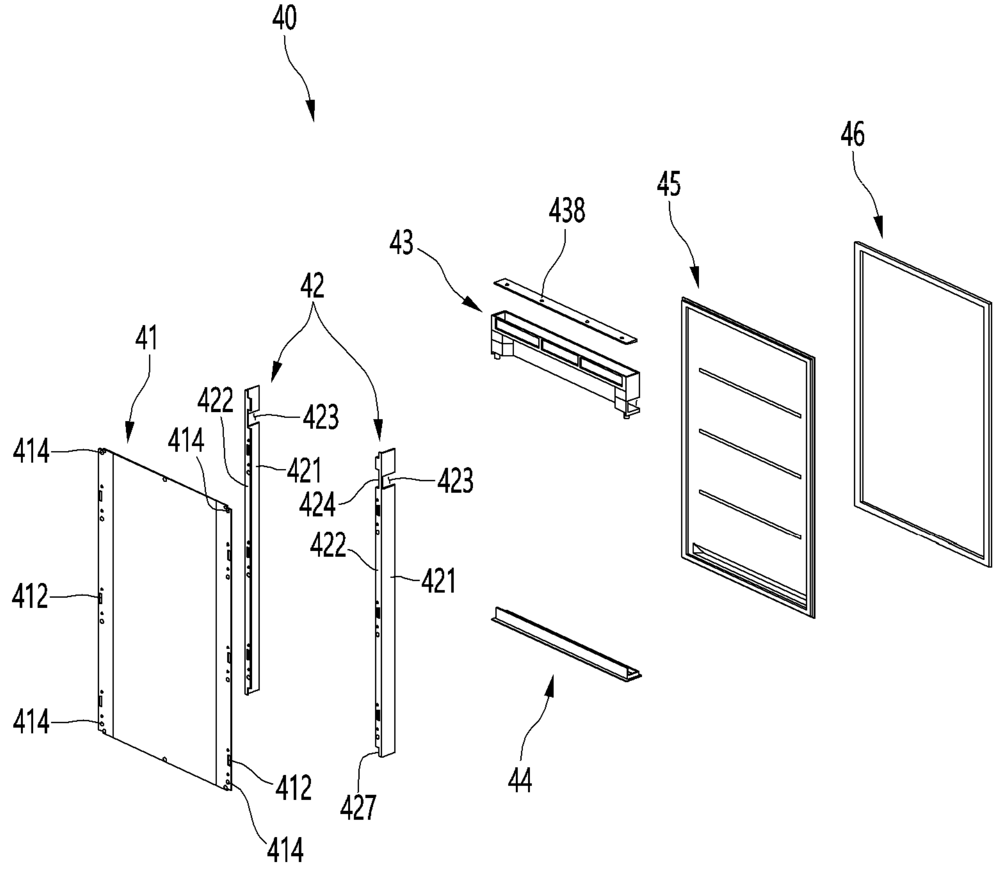
FIG. 9 is an exploded perspective view illustrating a door body, which is a component of the door.

FIG. 8 is a perspective view of the door viewed from the rear. In addition, FIG. 9 is an exploded perspective view illustrating a door body, which is a component of the door.

As illustrated in the drawing, the door body 40 as a whole has a front plate 41, a side frame 42, an upper cap deco 43, a lower cap deco 44, a door liner 45, and a gasket 46. In addition, an insulating material 400 may be filled inside the door body 40.

In detail, the front plate 41 forms the front surface of the door body 40 and may be formed in a plate shape. The front plate 41 may be formed of a steel material and forms a surface facing the rear surface of the panel assembly 50.

A plurality of plate openings 412 may be formed in the vertical direction along both side ends of the front plate 41. The plate opening 412 may be formed at a corresponding position so that the panel fixing member 55 to be described below can be inserted.

In addition, a plurality of plate holes 414 may be formed along the circumference of the front plate 41. Screws that are fastened to the upper cap deco 43 and the lower cap deco 44 and the side frames 42 on both sides may be fastened to the plate hole 414.

The upper cap deco 43 and the lower cap deco 44 are respectively disposed at the upper and lower ends of the front plate 41 to form the upper and lower surfaces of the door body 40. In addition, a hinge mounting part 432 on which the hinge 13 is mounted may be formed on the upper cap deco 43, and a lower hinge mounting part on which the lower hinge 60 is mounted may be formed on the lower cap deco 44.

In addition, the side frame 42 is coupled to both left and right side ends of the front plate 41, and the upper and lower ends of the side frame 42 may be connected to the upper cap deco 43 and the lower cap deco 44 respectively. In addition, the side frame 42 may also be coupled to the front plate 41.

The side frame 42 may be extruded from a metal material such as aluminum and may be configured to be combined with the upper cap deco 43 and the front plate 41 to reinforce structural strength.

The side frame 42 is exposed to the outside of the door 20 and may include a frame side surface 421 forming a side surface of the door 20 and a frame front surface 422 extending vertically inside from the frame side surface 421 and supporting the front plate 41.

A side support end 421*a* which protrudes further forward than the frame front surface 422 and supports the panel 51 from the side may be formed at a front end of the frame side 41.

Meanwhile, a front opening 424 and a side opening 423 may be formed on the frame side surface 41 and the frame front surface 422 of the side frame 42 at positions corresponding to the hinge mounting part 432, respectively. In addition, a lower opening 427 may be formed at a lower end of the frame front surface 422 at a position corresponding to the lower hinge mounting part 432.

The front opening 424 may be formed by cutting one end of the frame front surface 422 to receive the mounting part front surface 432*c* of the hinge mounting part 432. Accordingly, when the sub door 20 is assembled, the front surface 432*c* of the mounting part of the hinge mounting part 432 may be exposed through the front opening 424 and may directly contact the front panel 51.

In addition, the side opening 423 may be formed to have a corresponding size at a position corresponding to the opened side surface of the hinge mounting part 432. The side opening 423 may be formed by cutting one end of the frame side surface 41. Accordingly, when the sub door 20 is assembled, the inner portion of the hinge mounting part 432 may be exposed through the side opening 423.

The hinge mounting part 432 may include an mounting part upper surface 432*b* and a mounting part lower surface 432*a* to form a space 21 in which the hinge 15 is received.

The mounting part upper surface 432*b* and a mounting part lower surface 432*a* may form circumferential surfaces connected to each other. Particularly, some of the circumferential surfaces of the hinge mounting part 432 may form the front surface 431 of the upper cap deco 43. In addition, a hinge bush 211 into which the hinge pin 151 is inserted may be inserted into a lower surface of the hinge mounting part 432.

The door liner 45 may be coupled to the rear surface of the upper cap deco 43, the lower cap deco 44, and the side frame 42. The door liner 45 may be formed in a plate shape to form a rear surface of the door body 40. The door liner 45 may be formed of a plastic material and may be vacuum-molded to form the shape of the rear surface of the door body 40.

A gasket groove may be formed around the rear surface of the door liner 45, and the gasket 46 may be disposed along the gasket groove. The gasket 46 may contact the circumference of the cabinet 10 to seal the storage space in a state where the door 20 is closed.

Hereinafter, the structure of the upper cap deco 43 will be described in more detail with reference to the drawings.

Figure 10:
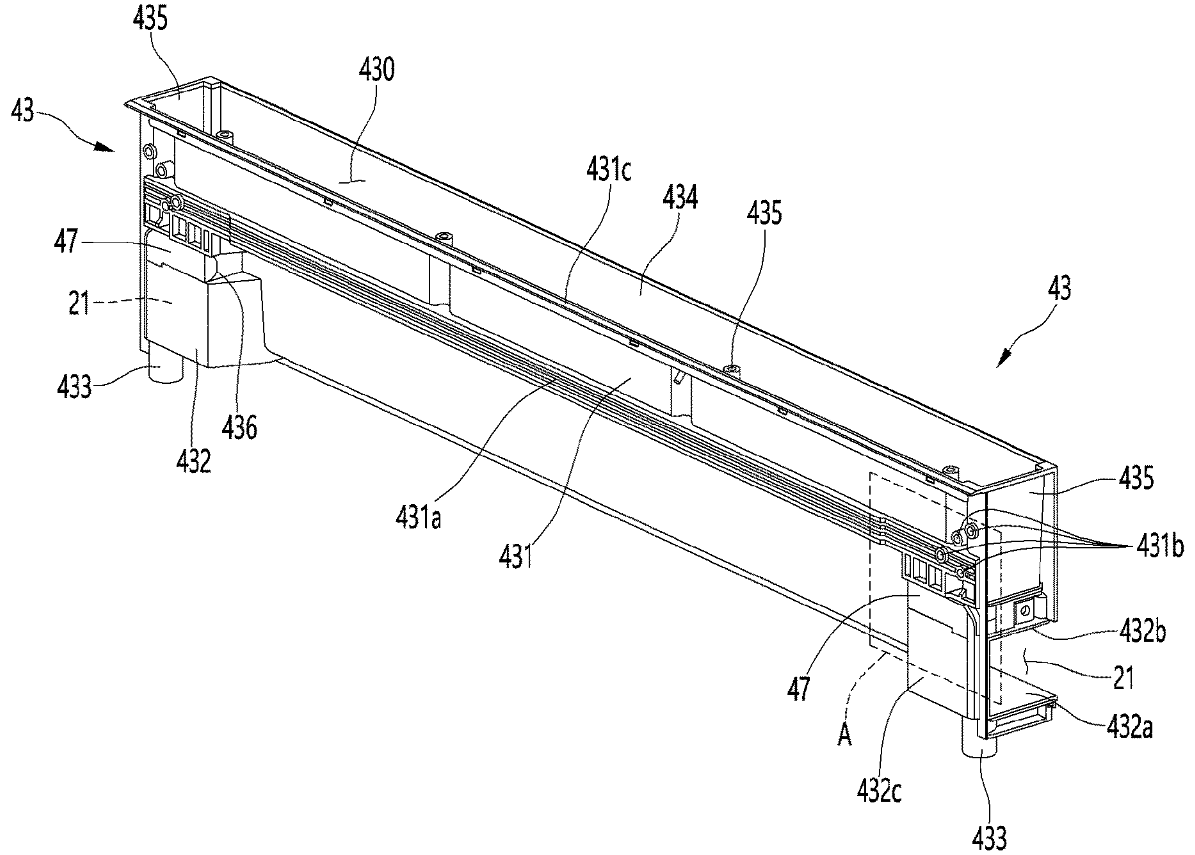
FIG. 10 is a perspective view of an upper cap deco, which is a component of the door body, viewed from the front.
Figure 11:
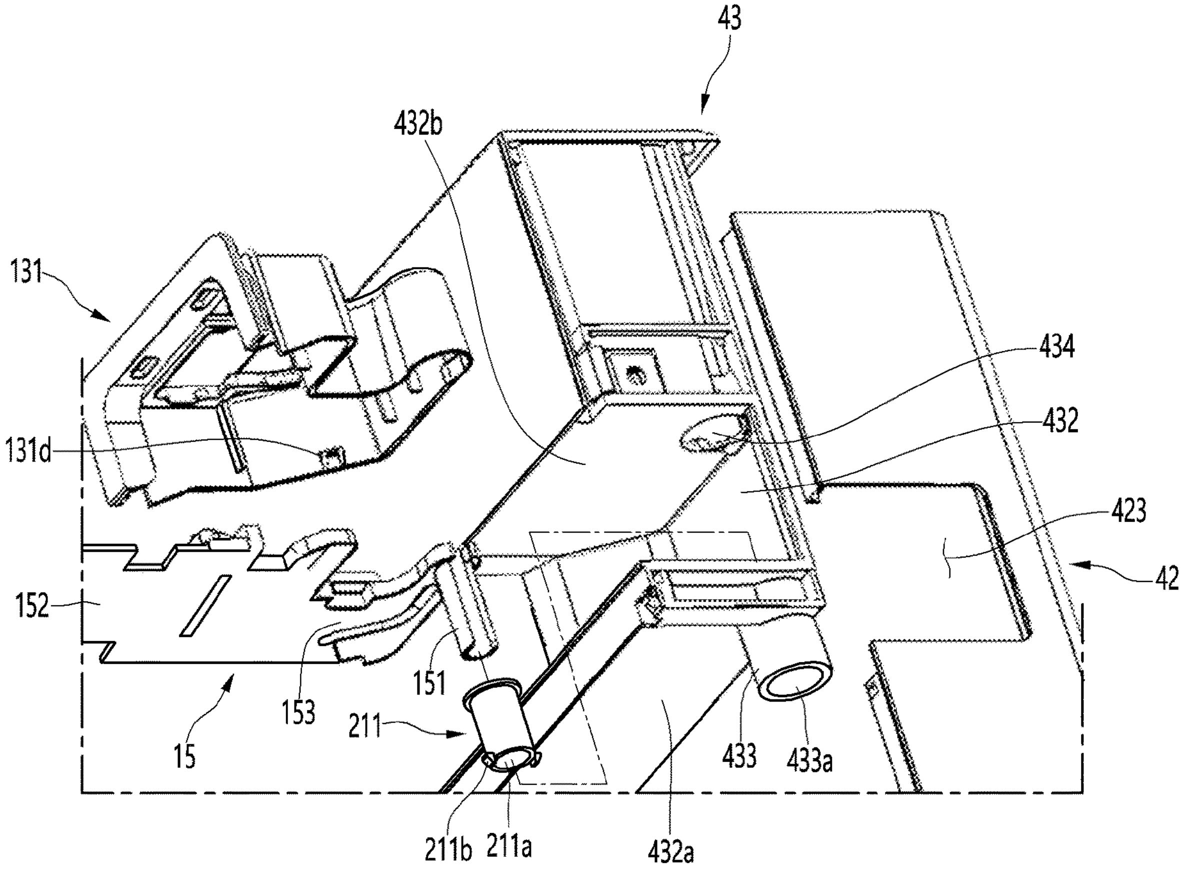
FIG. 11 is a partial exploded perspective view illustrating the coupling structure of the upper cap deco and the hinge device.
Figure 12:
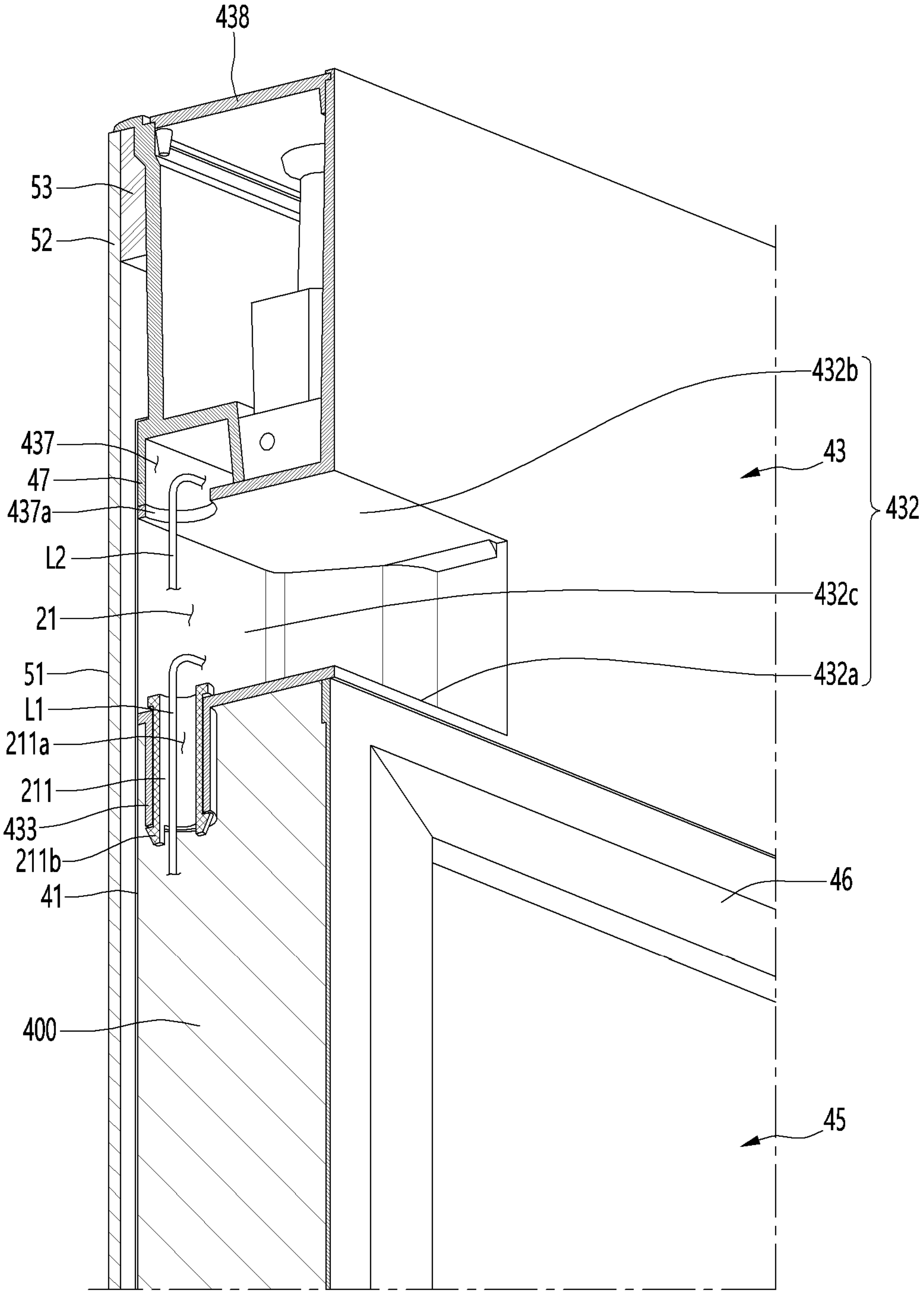
FIG. 12 is a cut-away perspective view taken along line XII-XII' of FIG. 8.

FIG. 10 is a perspective view of an upper cap deco, which is a component of the door body, viewed from the front. In addition, FIG. 11 is a partial exploded perspective view illustrating the coupling structure of the upper cap deco and the hinge device. FIG. 12 is a cut-away perspective view taken along line XII-XII' of FIG. 3.

As illustrated in the drawing, the upper cap deco 43 may form an upper portion of the door 20 and may form an upper surface of the door 20 exposed to the outside in an assembled state. In addition, the upper cap deco 43 may be configured to support upper ends of the front plate 41, the door liner 45, and the side frame 42.

In detail, the upper cap deco 43 may be formed of a plastic material and may include a front surface 431 and a rear surface 434 and both side surfaces 435. A front plate 41 is coupled to the front surface 431, a door liner 45 is coupled to the rear surface 434, and the side frames 42 may be coupled to each of the left and right side surfaces 435.

In addition, a recessed space 430 with an opened upper surface may be formed in the upper cap deco 43, and a screw may be fastened to the upper end of the panel assembly 50 through the recessed space 430. Further, a PCB for controlling electronic components provided in the door 20 may be received inside the recessed space 430. In addition, the opened upper surface of the recessed space 430 may be shielded by a decor cover 438.

Meanwhile, the front surface of the upper cap deco 43 may be formed in a shape in which a lower portion protrudes more rearward than an upper portion. In addition, an upper plate coupling part 431*a* supporting the front plate 41 from the rear may be formed on the front surface 431 of the upper cap deco 43. The upper plate coupling part 431*a* may extend from a left end to a right end of the upper cap deco 43 and may be formed such that a plurality of ribs and grooves are continuously disposed at predetermined gaps.

In addition, the upper plate coupling part 431*a* and the upper cap deco 43 may be coupled by a screw. In addition, when the foaming liquid is injected under the upper cap deco 43 for the molding of the insulating material 400, the upper cap deco 43 and the front plate 41 can be joined while the groove of the upper plate coupling part 431*a* is filled with the foaming liquid.

In addition, an upper support end 431*c* protruding forward may be formed at an upper end of the front surface 431 of the upper cap deco 43. The upper support end 431*c* may protrude forward and may support an upper end of the panel assembly 50. In addition, a plurality of protrusions protruding downward may be formed on the upper support end 431*c* and may be coupled to an upper bracket 53 provided on the upper end of the panel 51 to fix the upper end of the panel assembly 50.

A plurality of upper screw holes 431*b* may be formed on the front surface of the upper cap deco 43. The upper screw hole 431*b* is for coupling with the front plate 41 and the side frame 42 and may be formed at a position adjacent to the hinge mounting part 432. The upper screw hole may be formed on the left and right upper portions of the front surface of the upper cap deco 43 whose strength is weakened due to the shape of the hinge mounting part 432. In addition, the upper screw holes 431*b* may be equally disposed at positions symmetrical to both left and right sides.

For example, two upper screw holes 431*b* are disposed on the upper plate coupling part 431*a* to fasten the fastening member S penetrating the front panel 51, and the two upper screw holes 431*b* are disposed on the upper plate coupling part 431*a* to fasten the fastening member S penetrating the side frame 42. The fastening member S may be composed of a screw, bolt or rivet.

Meanwhile, hinge mounting parts 432 may be formed on both left and right side surfaces and rear surfaces of the upper cap deco 43. The hinge mounting part 432 forms a space 21 in which the front end of the hinge 13 is received. The hinge mounting part 432 has a height and width in which a part of the hinge plate 15 and the hinge cover 131 can be received, and may be formed in a size that does not interfere with the hinge cover 131 even when the door 20 is rotated for opening and closing.

In detail, the hinge mounting part 432 as a whole may include a mounting part lower surface 432*a* forming a bottom surface and a mounting part upper surface 432*b* forming an upper surface. In addition, the upper surface of the mounting part and the lower surface of the mounting part may be connected to each other to form a circumferential surface of the hinge mounting part.

Among the circumferential surfaces of the mounting part, the mounting part front surface 432*c* may have a structure that protrudes forward and protrudes to the position of the front plate 41 and may have a structure capable of being completely in close contact with the rear surface of the front plate 41. Accordingly, the hinge mounting part 432 may have a shape that is recessed as far forward as possible from the door body 40, and the hinge pin 151 disposed on the hinge mounting part 432 is also disposed within a possible range in the most forward direction.

In addition, the hinge mounting part 432 may be opened through the side and rear surfaces of the upper cap deco 43, and thus, a space in which the hinge 13 is inserted and mounted from the rear, and a space in which the door 20 is rotated for opening and closing can be secured.

Meanwhile, a mounting part boss 433 may be formed on the mounting part lower surface 432*a*. The mounting part boss 433 may be formed at a position corresponding to the position of the hinge pin 151 and may be formed in a shape of a tube extending downward in which a space with a hollow 433*a* is formed therein.

In this case, the position of the mounting part boss 433 may be located at an edge of the lower surface 432*a* of the mounting part, that is, an edge region formed by the front end and the outer end. In addition, a hinge bush 211 may be inserted and mounted inside the mounting part boss 433.

The hinge bush 211 is formed in a hollow tube shape, and provides a pin mounting hole 211*a* through which the hinge pin 151 is inserted and rotated. The hinge bush 211 may be formed of an engineering plastic material to prevent wear when rubbing against the hinge pin 151 and to facilitate rotation of the hinge pin 151.

In addition, an upper end of the hinge bush 211 may be seated around the opened upper surface of the mounting part boss 433. In addition, the lower end of the hinge bush 211 may extend to the lower end of the mounting part boss 433. In addition, a bush locking portion 211*b* is formed at the lower end of the hinge bush 211 and is locked to the lower end of the mounting part boss 433, and thus a state where the hinge bush 211 is firmly fixed to the mounting part boss 433 is maintained.

When the door 20 is mounted, the hinge pin 151 may be inserted into the hinge bush 211. In addition, the electric wire L1 may be guided into the door 20 through the hinge pin 151. The electric wire L1 may be referred to as a first electric wire L1 as a part of the electric wires L1 and L2 guided into the door. For example, the first electric wire L1 may be formed as wire for AC and may be connected to electrical components provided in the door 20.

Meanwhile, an upper surface opening 437*a* may be formed in the upper surface 432*b* of the mounting part. The upper surface opening 437*a* may guide the remaining electric wires L2 except for the electric wire L1 guided through the hinge bush 211 among electric wires L1 and L2 directed to the door 20. The upper surface opening 437*a* may be located at a position facing the electric wire hole 133 formed in the hinge cover 131. In other words, the upper opening 437*a*, the electric wire hole 133, and the hollow part 151*a* of the hinge pin 151 may be located on the same extension line.

The upper opening 437*a* may communicate with a guide space 437 formed by an electric wire guide part 436 shielded by a sealing cap 47 mounted on the front surface of the upper cap deco 43. In other words, another electric wire L2 guided to the door 20 is guided to the guide space 437 of the electric wire guide part 436 through the upper surface opening 437*a* and may be guided to the inside of the door 20 outside the upper cap deco 43 passing the electric wire guide part 436. The electric wire L2 may be formed as a wire for DC, for example, and the hollow part 151*a* of the hinge pin 151 and the upper opening 437*a* may guide different types of electric wires. In this case, the upper surface opening 437*a* may be formed to be larger than the diameter of the hinge pin 151 (for example, 8 mm), and the diameter of the upper surface opening 437*a* may be formed to be 9 mm, for example.

In addition, the electric wires L1 and L2 introducing into the door 20 may be connected to electrical components inside the door 20, for example, a heater, a lighting device, various switches or sensors, and may include a ground wire.

Meanwhile, the structure of the sealing cap 47 will be described in more detail below.

Figure 13:
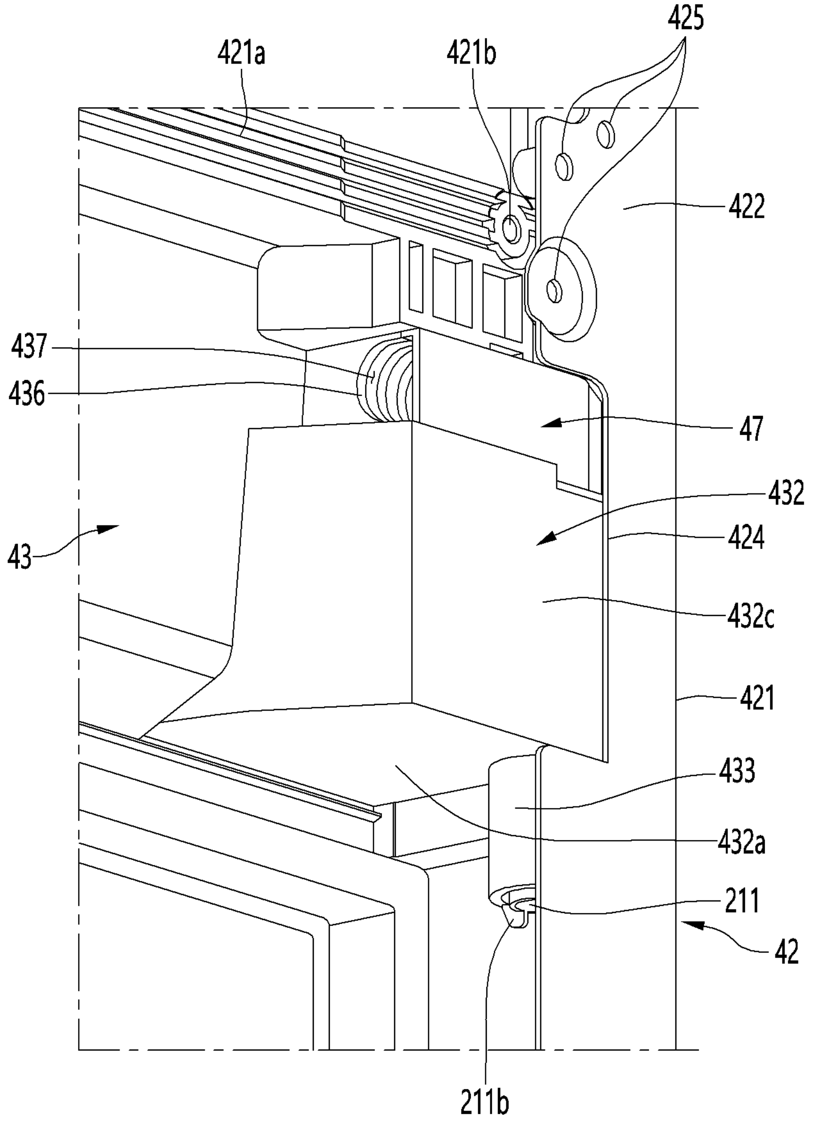
FIG. 13 is an enlarged view illustrating part A of FIG. 10.
Figure 14:
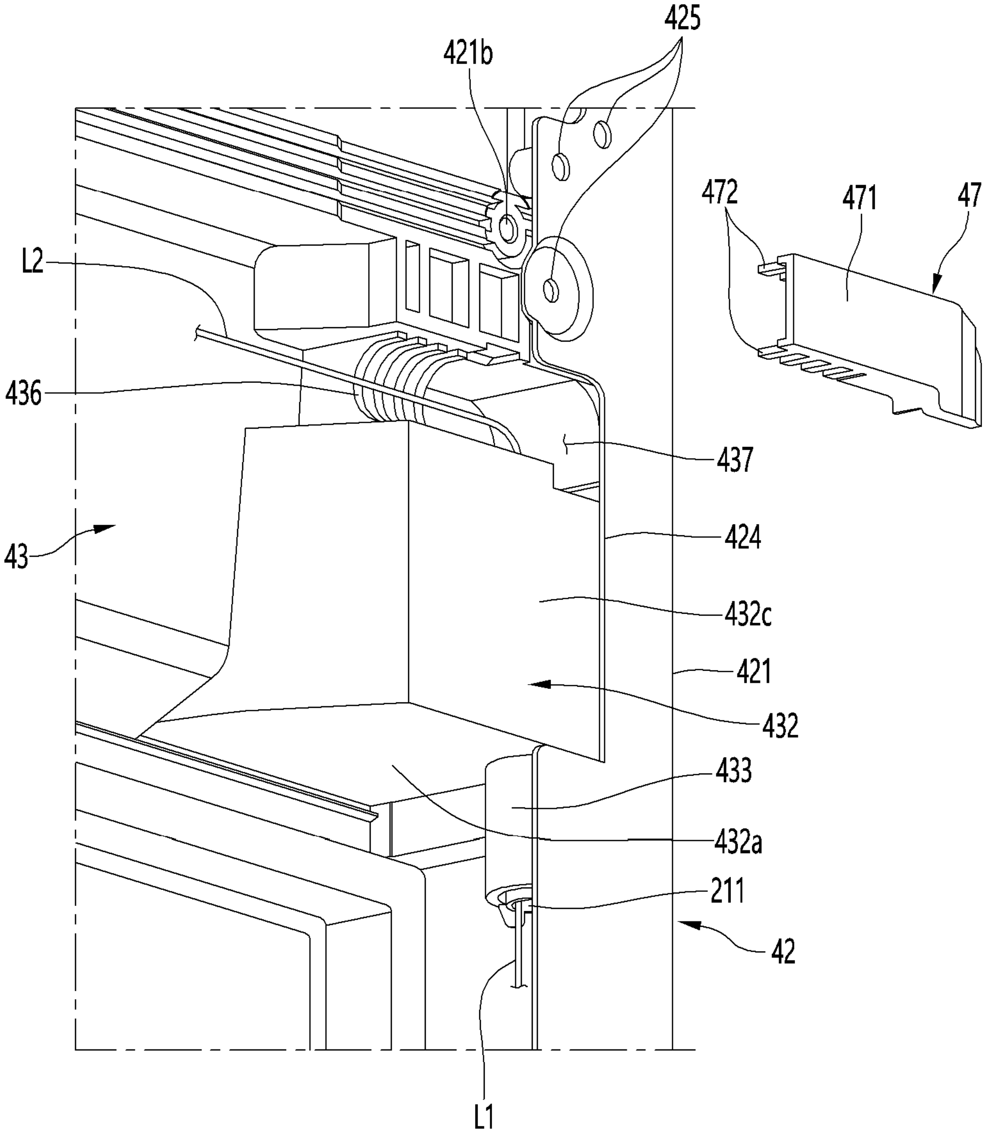
FIG. 14 is a view illustrating the disposition of electric wires in FIG. 13.
Figure 15:
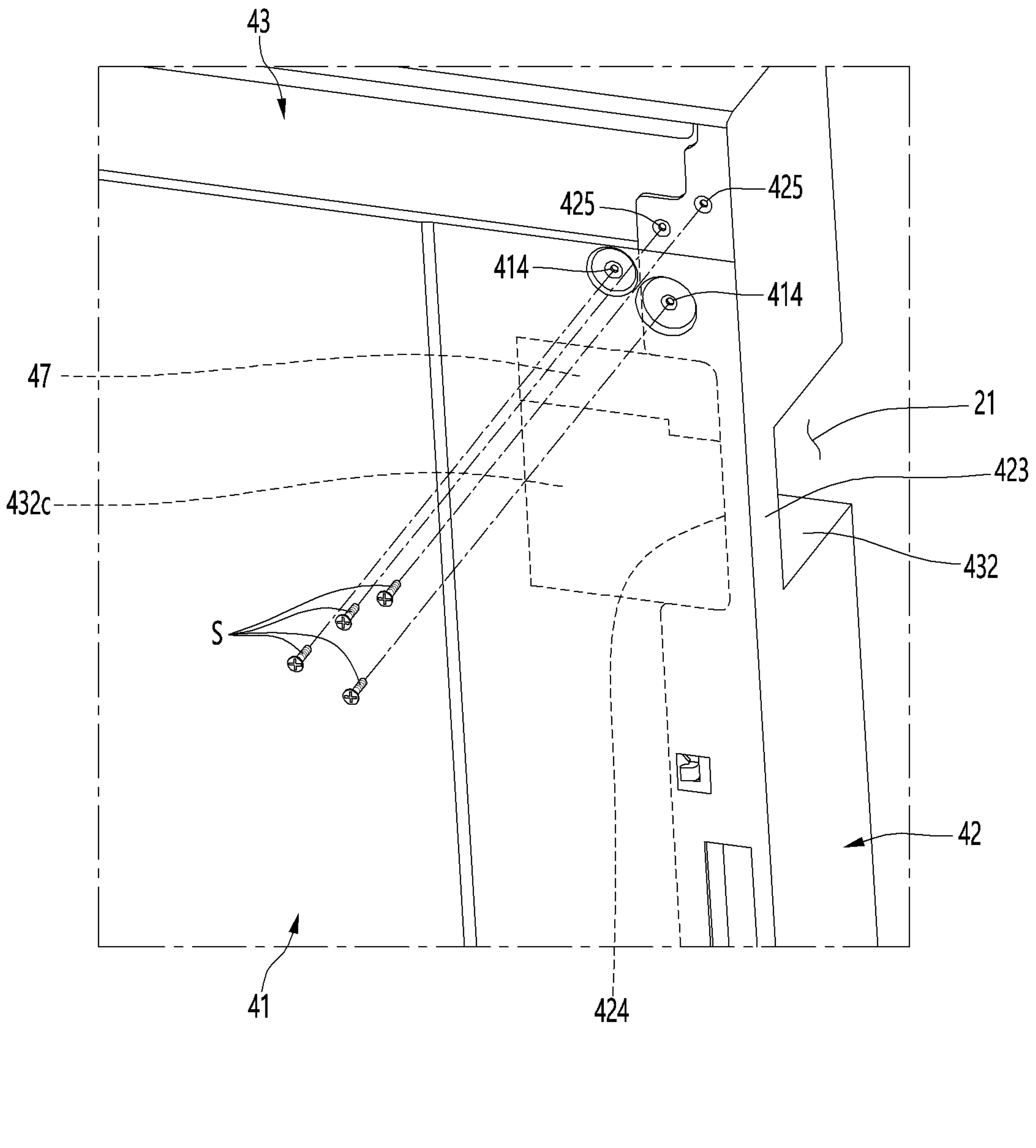
FIG. 15 is a partial perspective view illustrating an upper edge coupling structure of the door body.

FIG. 13 is an enlarged view illustrating part A of FIG. 10, FIG. 14 is a view illustrating the disposition of electric wires in FIG. 13, and FIG. 15 is a partial perspective view illustrating an upper edge coupling structure of the door body.

As illustrated in the drawing, a recessed electric wire guide part 436 may be formed on the front surface of the upper cap deco 43. The electric wire guide part 436 may be formed above the hinge mounting part 432 in contact with the upper surface, and the front surface may be shielded by the sealing cap 47.

Accordingly, a guide space 437 through which the electric wire L2 is guided by the electric wire guide part 436 and the sealing cap 47 may be formed. In addition, the guide space 437 may communicate with the upper surface opening 437*a*, and the electric wire L2 inside the door 20 passes through the guide space 437 and can be guided to the hinge mounting part 432 through the upper surface opening 437*a* and finally can be connected by a connector from the inside of the hinge cover 131.

The sealing cap 47 may be formed in a corresponding shape to shield the opened front surface of the electric wire guide part 436. In detail, the sealing cap 47 may include a cap front surface 471 formed in a size corresponding to the opened front surface of the electric wire guide part 436, and a cap side 472 extending rearward from both sides of the cap front surface 471 and supported on the inside of the electric wire guide part 436.

The cap side 472 may be inserted so as to be in contact with the inner upper and lower surfaces of the electric wire guide part 436, and the sealing cap 47 may be mounted to the electric wire guide part 436 in a press-fitting state. In addition, the cap side 472 may be formed in a shape of a protrusion and a groove corresponding to the electric wire guide part 436 to be inserted and fixed to the electric wire guide part 436 when the sealing cap 47 is mounted. In addition, the protrusion and groove structure of the electric wire guide part 436 and the cap side 472 can maintain a state where such the configurations for finishing are fixed when finishing the polyurethane or tape to prevent the foaming liquid from flowing into the guide space 437.

In the state where the sealing cap 47 is mounted, the front surface of the sealing cap 47 may be located on the same surface as the front surface 432*c* of the mounting part of the hinge mounting part 432 and thus may have a structure of being in contact with the rear surface of the front plate 41.

Meanwhile, the front surface 432*c* of the mounting part may be in surface contact with the front plate 41 while protruding forward. In other words, the hinge mounting part 432 may be recessed to the position of the front plate 41 forming the most front surface of the door body 40, and the position of the hinge pin 151 is also positioned in the front edge region by making the position of the hinge mounting part 432 forward as possible, thereby minimizing the rotation radius R of the edge of the door 20.

The front opening 424 may be formed at a position corresponding to the mounting part front surface 432*c* so that the mounting part front surface 432*c* is in contact with the front plate 41. Accordingly, the hinge mounting part 432 is located at a position corresponding to the front opening 424, and the mounting part front surface 432*c* passes through the frame front surface 422 of the side frame 42 and thus is in contact with the front plate 41. In addition, a side opening 423 is formed in the frame side surface 41 having the same height as the front opening 424, and thus the opened side surface of the hinge mounting part 432 may be exposed.

In this way, the front opening 424 and the side opening 423 are formed in the area of the side frame 42 corresponding to the position where the hinge mounting part 432 is mounted, so that the strength thereof is structurally weak. In addition, since the hinge pin 151 is disposed so as to penetrate at a position very close to the front end of the hinge mounting part 432 and the opened side end, the strength of the hinge mounting part 432 is further weakened. In such a situation, considering the weight of the door 20 and the load of the stored items disposed on the door 20, structural strength reinforcement of the hinge mounting part 432 in which the load can be concentrated is required.

In order to solve the problem of weak strength in the area of the hinge mounting part 432, the fastening member S is fastened so that the upper cap deco 43, the side frame 42, and the front plate 41, which overlaps each other at a position adjacent to the hinge mounting part 432 can be firmly coupled to each other. In other words, the upper cap deco 43, the side frame 42, and the front plate 41 are integrated so that the strength can be structurally reinforced. In particular, intensive reinforcement may be fastened to a position adjacent to the hinge mounting part 432.

In detail, a plurality of the upper screw holes 431*b* are formed on the upper cap deco 43 adjacent to the upper end of the hinge mounting part 432, and a plate hole 414 may be formed at a position corresponding to the position of the upper screw holes 431*b* at the upper edge of the front plate 41. Accordingly, the fastening member S passes through the plate hole 414 and the upper screw hole 431*b* to couple the upper cap deco 43 and the front plate 41.

In addition, at least a portion of the plate hole 414 is formed at a position corresponding to the frame screw hole 425 formed on the frame front surface 422 so that the fastening member S may be fastened to pass through the frame screw hole 425, the plate hole 414, and the upper screw hole 431*b*. Accordingly, the fastening member S may allow all the front plate 41, the side frame 42, and the upper cap deco 43 to be coupled to each other at once.

In addition, some of the plurality of upper screw holes 431*b* may be formed at positions corresponding to the frame screw holes 425. Therefore, the fastening member S penetrates the frame screw hole 425 and is fastened to the upper screw hole 431*b* so that the upper cap deco 43 and the side frame 42 can be firmly fixed.

In this way, the upper region of the door body 40 adjacent to the hinge mounting part 432 is fastened with the plurality of fastening members S, so that the upper cap deco 43, the side frame 42, and the front plate 41 can be firmly coupled.

Through this structure, the hinge mounting part 432 is recessed at the side end of the door body 40, and despite the structure in which the hinge pin 151 is disposed at the edge of the front end and the outer end, the required strength of the door 20 can be satisfied.

Hereinafter, referring to the drawings, the position of the hinge pin 151 inside the hinge mounting part 432 will be described in more detail.

Figure 16:
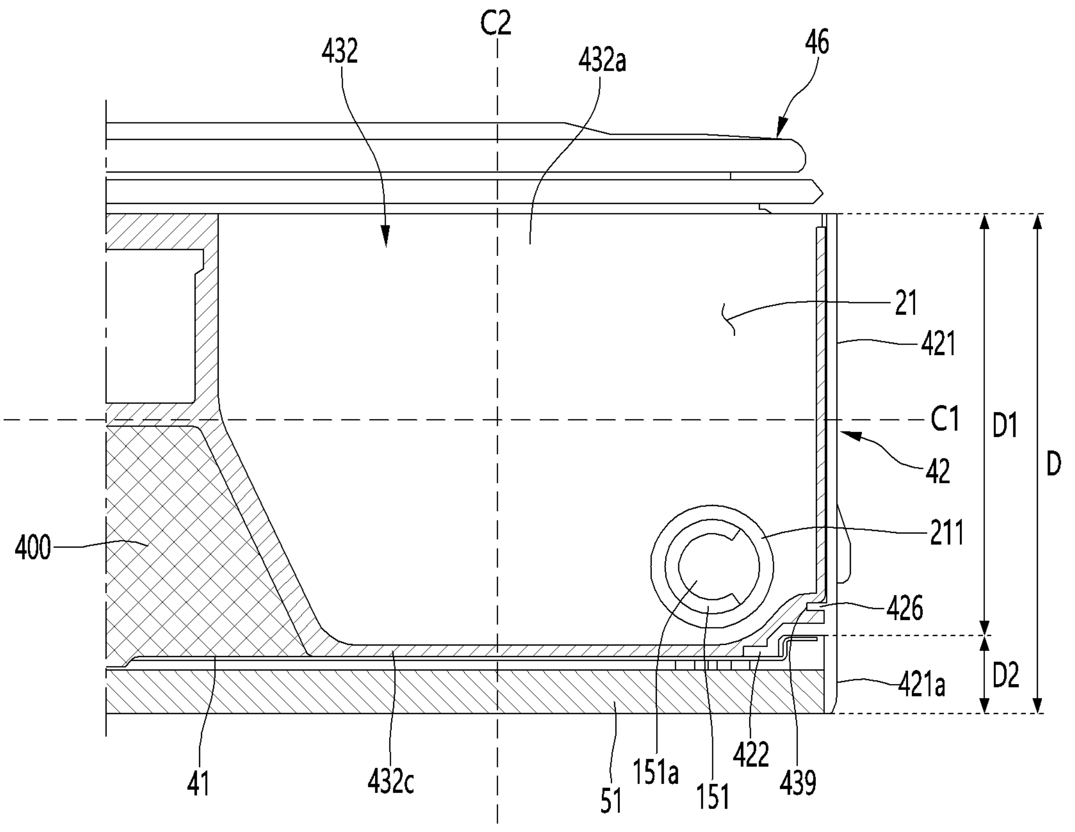
FIG. 16 is a cross-sectional view taken along line XVI-XVI' of FIG. 8.
Figure 17:
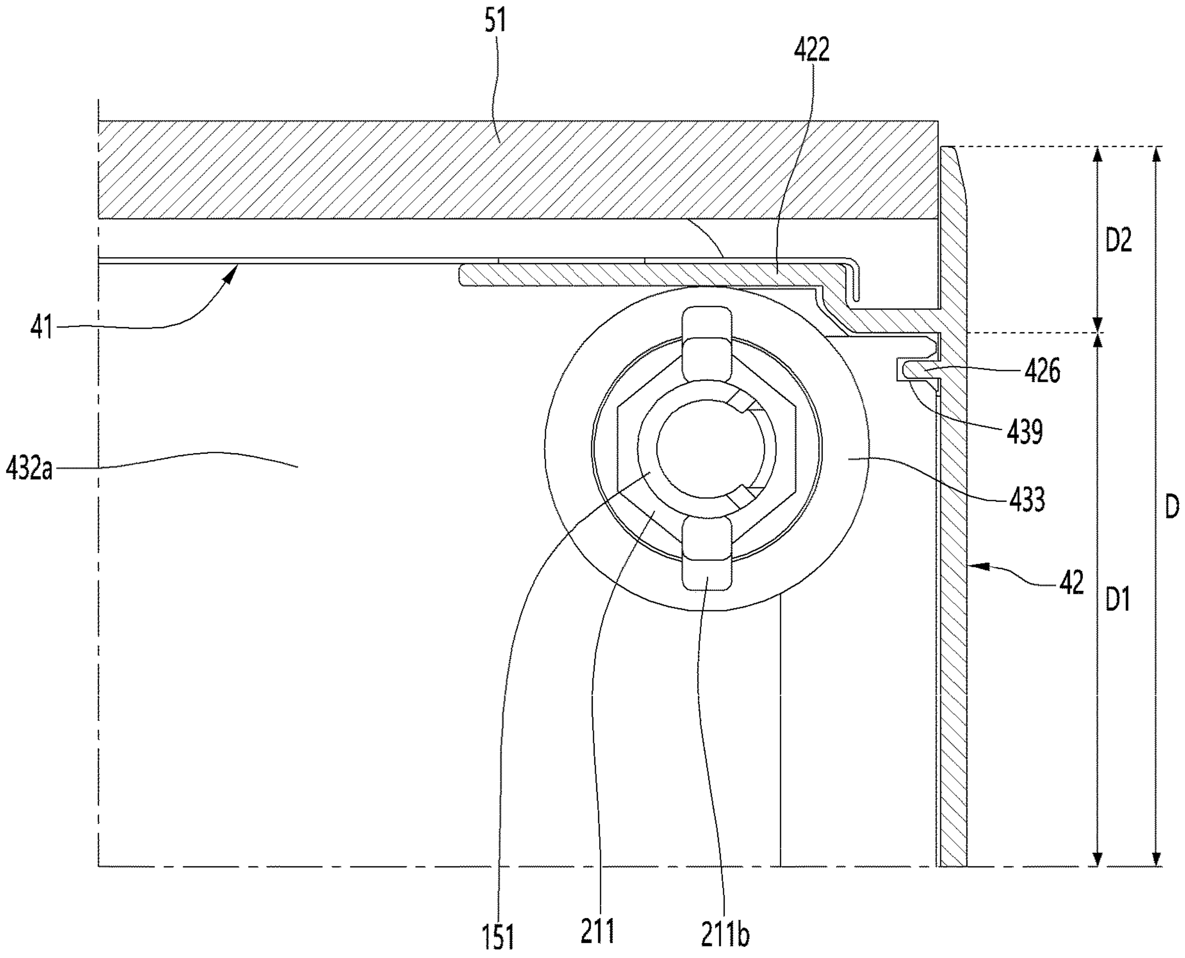
FIG. 17 is a cross-sectional view taken along line XVII-XVII' of FIG. 8.

FIG. 16 is a cross-sectional view taken along line XVI-XVI' of FIG. 8, and FIG. 17 is a cross-sectional view taken along line XVII-XVII' of FIG. 8.

As illustrated in the drawing, the inner space of the hinge mounting part 432 can be divided into four spaces by an extension line C1 passing through the center based on the front and rear direction, and an extension line C2 crossing the extension line C1 and passing through the center based on the left and right directions, and the hinge bush 211, including the hinge pin 151 having concentricity, and the mounting part boss 433 may all be located on the right front quadrant.

In other words, the hinge pin 151 can be configured to be located further forward based on the middle point in the front and rear direction among the inner space of the hinge mounting part 432 and further to the right (outward direction of the door) of an intermediate point in the front-rear direction among the inner space of the hinge mounting unit 432.

In particular, the distance from the hinge pin 151 which is the rotation center of the door 20 to the edge of the door 20 becomes a rotation radius when the door 20 is rotated. Therefore, only when the rotation radius is minimized, it is possible to prevent interference with adjacent furniture, walls O, or home appliances when the door 20 is rotated.

To this end, the hinge pin 151 may be positioned at a location of an edge region formed by the front surface and right surfaces as possible from the inside of the hinge mounting part 432. Especially, the front surface of the door 20 may be formed in a flat shape and the door may be formed as the thickness obtained by adding the thickness of the insulating area D1 filled with the insulating material 400 among the thickness D of the entire door 20 and the thickness of the panel area D2 on which the panel assembly 50 is mounted. For example, in a case where the overall thickness of the door 20 is about 55 mm, the thickness of the insulating area D1 may be 49 mm, and the thickness of the panel area D2 may be 6 mm.

The hinge mounting part 432 may be formed in the insulating area D1 filled with the insulating material 400, and therefore, even if the hinge pin 151 is positioned at the most front of the hinge mounting portion 432, the hinge pin 151 is forced to be positioned at the rear by the thickness of the panel area D2.

Accordingly, by forming the hinge mounting part 432 to protrude toward the panel area D2, the hinge pin 151 may be positioned more forward, thereby minimizing the rotation radius R. The front surface 432*c* of the mounting part of the hinge mounting part 432 may protrude so as not to interfere with the frame front surface 422 of the side frame 42 and may protrude to a position in close contact with the rear surface of the panel assembly 50.

In addition, the side frame 42 may be coupled to the side surface 435 of the upper cap deco 43, and the coupling structure between the side frame 42 and the upper cap deco 43 may be formed so as not to interfere with the circumference of the hinge bush 211 on which the hinge pin 151 is disposed.

In detail, a frame constraining protrusion 426 may be formed on a side surface of the side frame 42. The frame constraining protrusion 426 may be spaced apart from the front surface of the side frame 42 and may protrude along the side surface of the side frame 42. Further, a frame protrusion groove 439 in which the frame constraining protrusion 426 is received may be formed on a side surface of the upper cap deco 43.

In this case, the frame constraining protrusion 426 and the frame protrusion groove 439 may have a shape protruding into the inside of the hinge mounting part 432. In addition, the frame constraining protrusion 426 and the frame protrusion groove 439 are formed on the circumferential side of the area in which the hinge cover 131 is mounted so as not to interfere with the hinge cover 131 inside the hinge mounting part 432. In other words, the frame constraining protrusion 426 and the frame protrusion groove 439 are disposed in a space between the circumference of the hinge bush 211 and the mounting part boss 433 and the edge region of the hinge mounting part 432, and, by forming a rounded inner surface of the edge region of the corresponding hinge mounting part 432 to correspond to the frame constraining protrusion 426 and the frame protrusion groove 439, the position through which the hinge pin 151 passes can be positioned to the front and lateral edges as much as possible.

Therefore, despite the existence of the panel area D2 on which the flat panel 51 is mounted, the rotation radius R of the edge of the door 20 is minimized, so that the hinge pin 151 may be positioned at a point at which the edge of the door 20 can prevent interference with adjacent furniture, walls O, or home appliances during the rotation process of the door 20.

Hereinafter, a relationship between the hinge 13, the door, and the cabinet 10 according to the opening and closing of the door 20 will be described with reference to the drawings.

Figure 19:
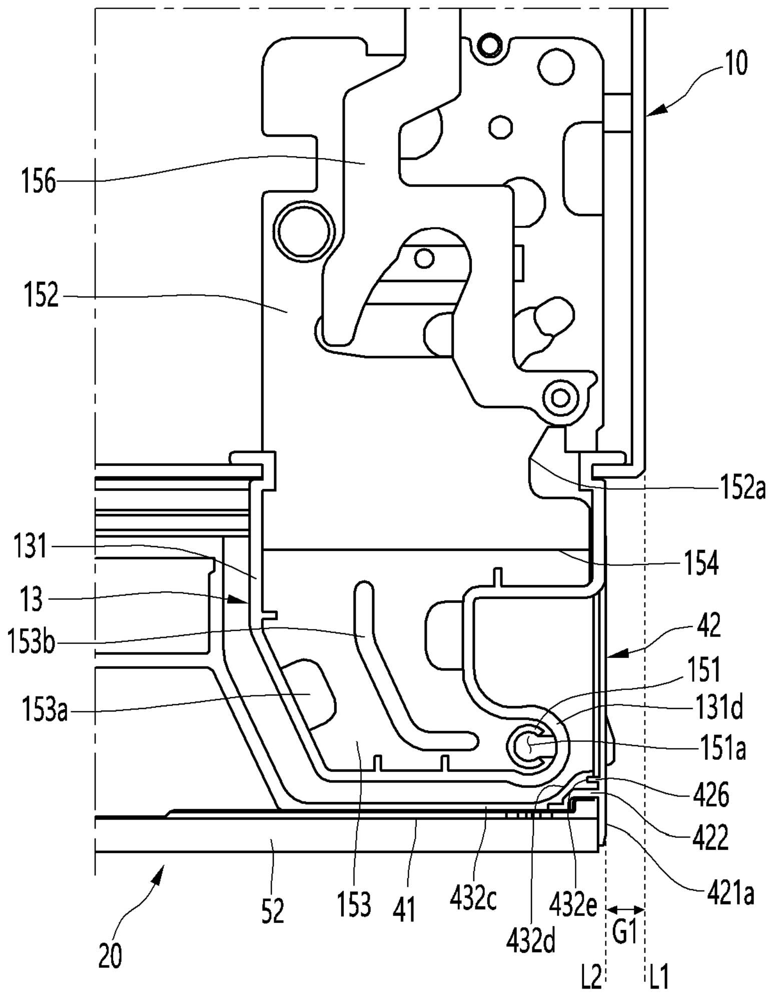
FIG. 19 is a cross-sectional view illustrating a disposition of a hinge plate, a door, and a cabinet in a state where the door is closed.
Figure 20:
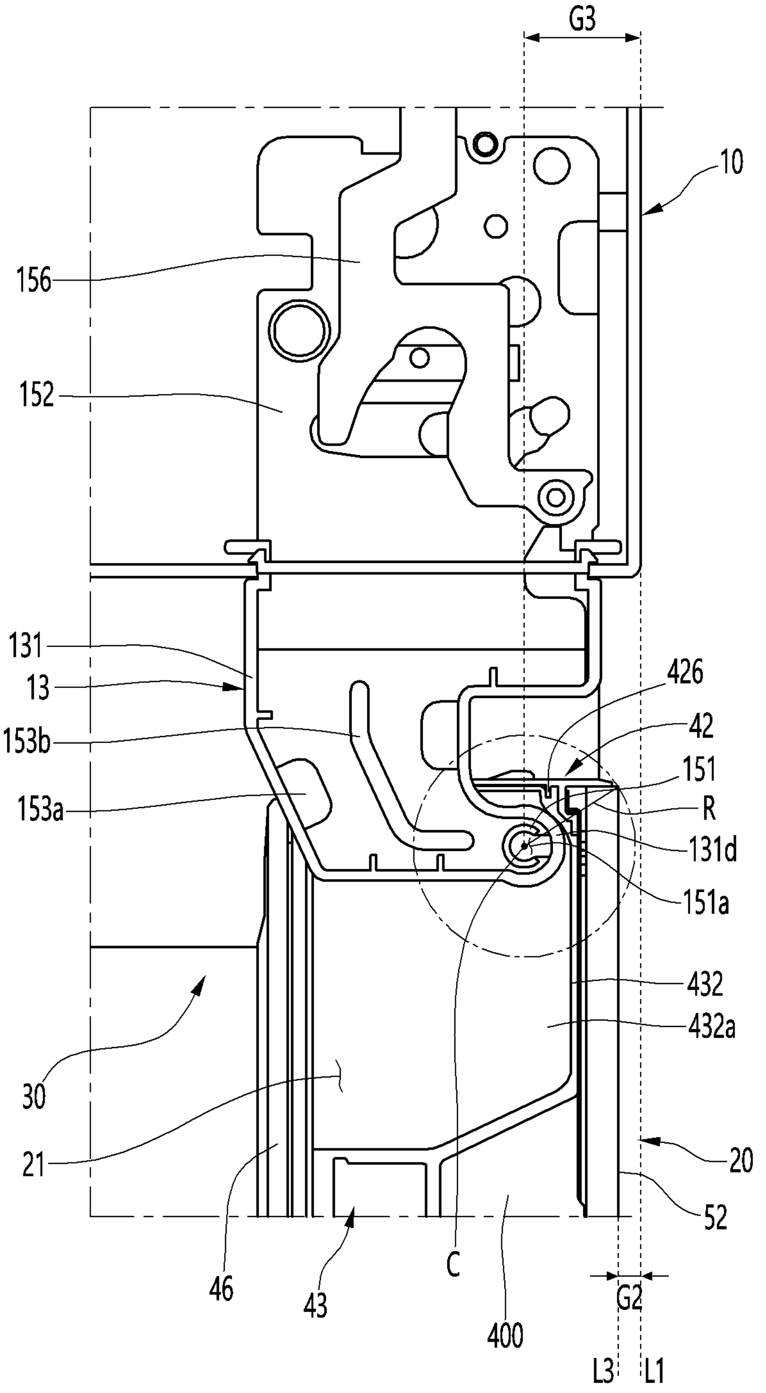
FIG. 20 is a cross-sectional view illustrating a disposition of a hinge plate, door, and a cabinet in a state where the door is opened.

FIG. 19 is a cross-sectional view illustrating a disposition of a hinge plate, a door, and a cabinet in a state where the door is closed, and FIG. 20 is a cross-sectional view illustrating a disposition of a hinge plate, door, and a cabinet in a state where the door is opened.

As illustrated in the drawing, in a state where the door 20 is closed to shield the storage space, the side surface of the door 20 is positioned further inside by a set distance G1 than the side surface of the cabinet 10.

In detail, as illustrated in FIG. 19, in a state where the door 20 is closed, the extension line L1 of the side surface of the cabinet 10 and the extension line L2 of the side surface of the door 20 are spaced apart by a set distance G1, and the side surface of the cabinet 10 may further protrude outward. Accordingly, the rotation radius R of the edge of the door 20 may not protrude to the outside of the cabinet 10 or may be minimized.

For example, the set distance G1 may be approximately 5 mm to 6 mm, and when viewed from the front, the cabinet 10 may slightly protrude outward from the side surface of the door 20. Of course, although the cabinet 10 has a structure protruding more laterally than the door 20, the degree is not large, and in a case where the refrigerator 1 is disposed adjacent to the furniture, wall O, or a home appliance such as the refrigerator 1', the cabinet 10 is located at the rear of the door 20 so that the cabinet will be difficult to identify from the outside.

Meanwhile, the door 20 may be rotated to open and may be rotated at an angle of 90° or more so that the storage member 100 such as a drawer or shelf in the refrigerator can be pushed in and pulled out.

As illustrated in FIG. 20, in a state where the door is opened at a 90° angle, the front surface of the door 20 may be located further inside the cabinet 10 by a set distance G2 than the side surface of the cabinet 10, and such a set distance G2 can be achieved by disposing the rotation shaft of the hinge 13. For example, the set distance G2 may be 1.4 mm.

In detail, in a case where the door 20 is opened at a 90° angle, the extension line L1 of the side surface of the cabinet 10 and the extension line L3 of the front surface of the door 20 are spaced apart by a set distance G2, and the side surface of the cabinet 10 may further protrude outward. Accordingly, even in a state where the door 20 is open, the front surface of the door 20 does not interfere with the neighboring furniture, wall O, or a home appliance such as the refrigerator 1'.

In addition, when the door 20 is rotated, the rotation radius R formed by the edge of the door 20 may be the same as the extension line of the side surface of the cabinet 10 or protrude by a minimum distance.

For example, it may be located at a point spaced apart by a set distance G3 from the center of the hinge pin 151 of the door 20, that is, the rotation center to the side surface of the cabinet 10, and the set distance G3 can be about 19 mm. In addition, the hinge pin 151 is positioned at a point where the rotation radius R formed by the edge of the door 20 may be approximately 20.5 mm.

Therefore, even when the edge of the door 20 protrudes as much as possible during the rotation process for opening and closing of the door 20, the edge of the door 20 protrudes about 1.5 mm from the outer surface of the cabinet 10, when considering that the furniture, wall O, or a home appliance such as a refrigerator 1' which is adjacent to the cabinet 10 is installed to have a gap of about 13 mm to 15 mm, it may be guaranteed that the door is opened without interference with the furniture, wall O, or a home appliance such as a refrigerator 1' which is adjacent to the door, and the door may be opened at an angle of 90° or more to ensure the pulling-in and pulling-out of the storage member 100 inside the storage space.

Meanwhile, the door 20 is supported from below by a lower hinge 60 mounted on the lower cap deco 44 and rotates about the lower hinge 60 as a shaft. Hereinafter, the disposition of the lower hinge 60 will be described in more detail.

Figure 18:
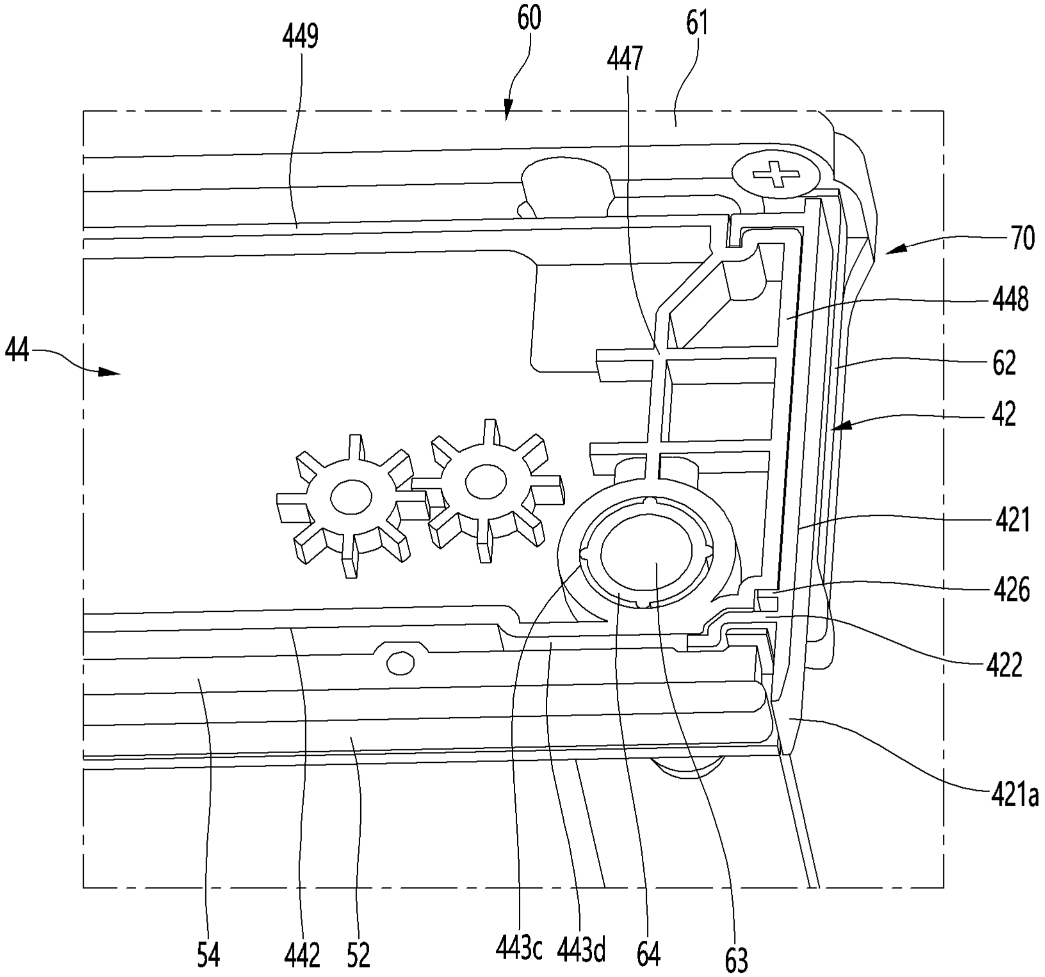
FIG. 18 is a cross-sectional view taken along line XVIII-XVIII' of FIG. 2.
Figure 21:
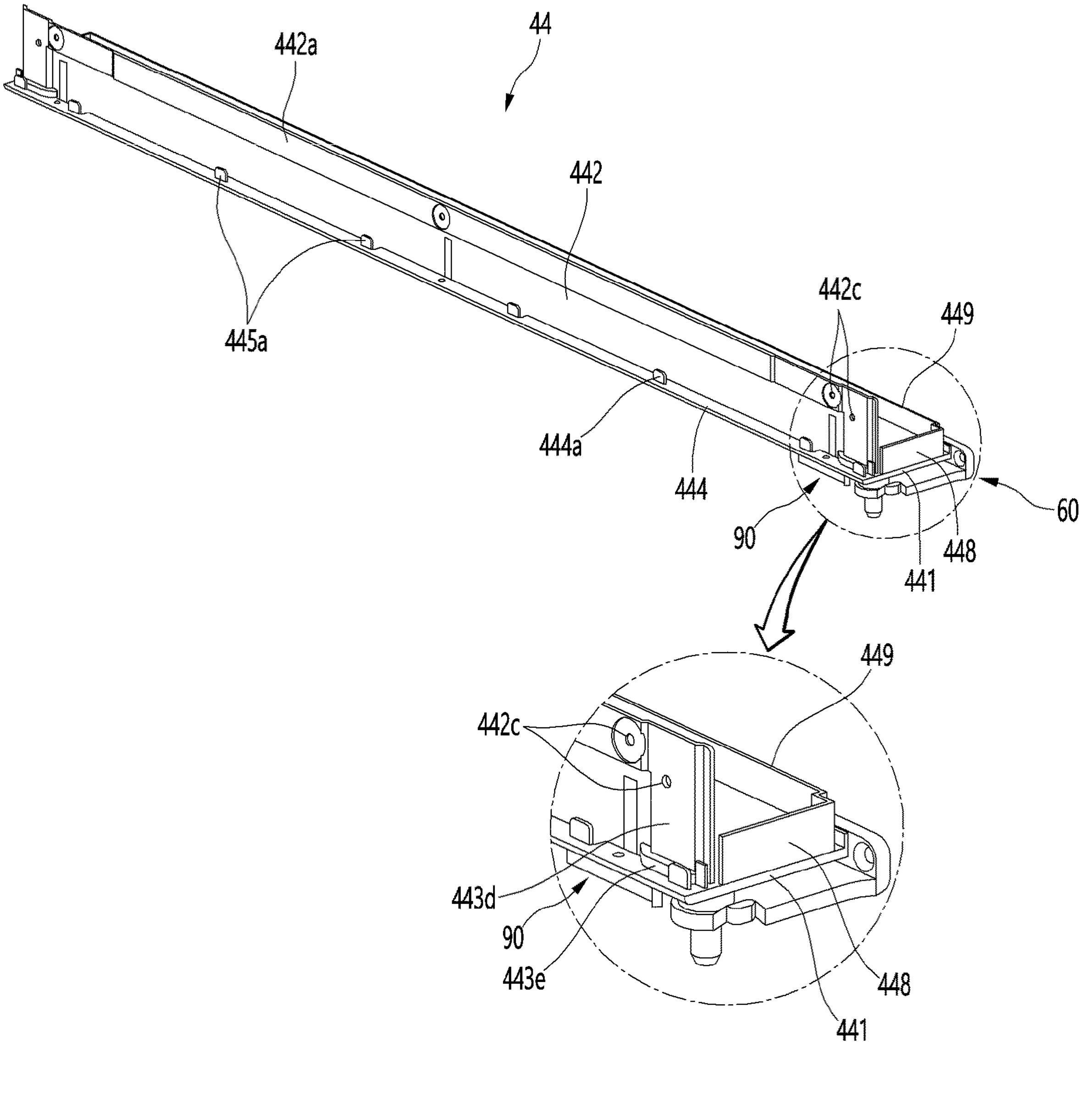
FIG. 21 is a perspective view illustrating a lower cab deco which is a component of the door body.
Figure 22:
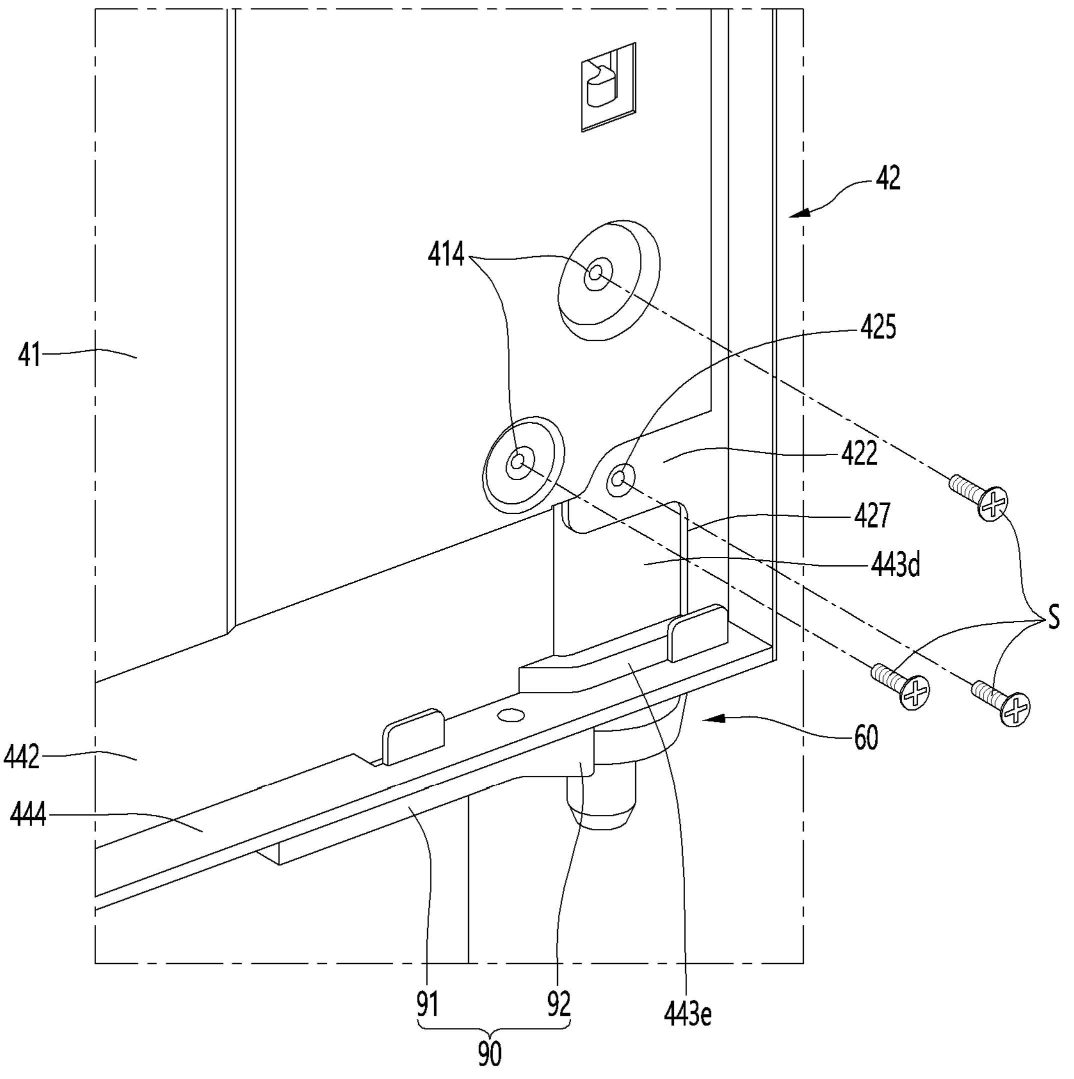
FIG. 22 is a partial perspective view illustrating a lower edge coupling structure of the door body.
Figure 23:
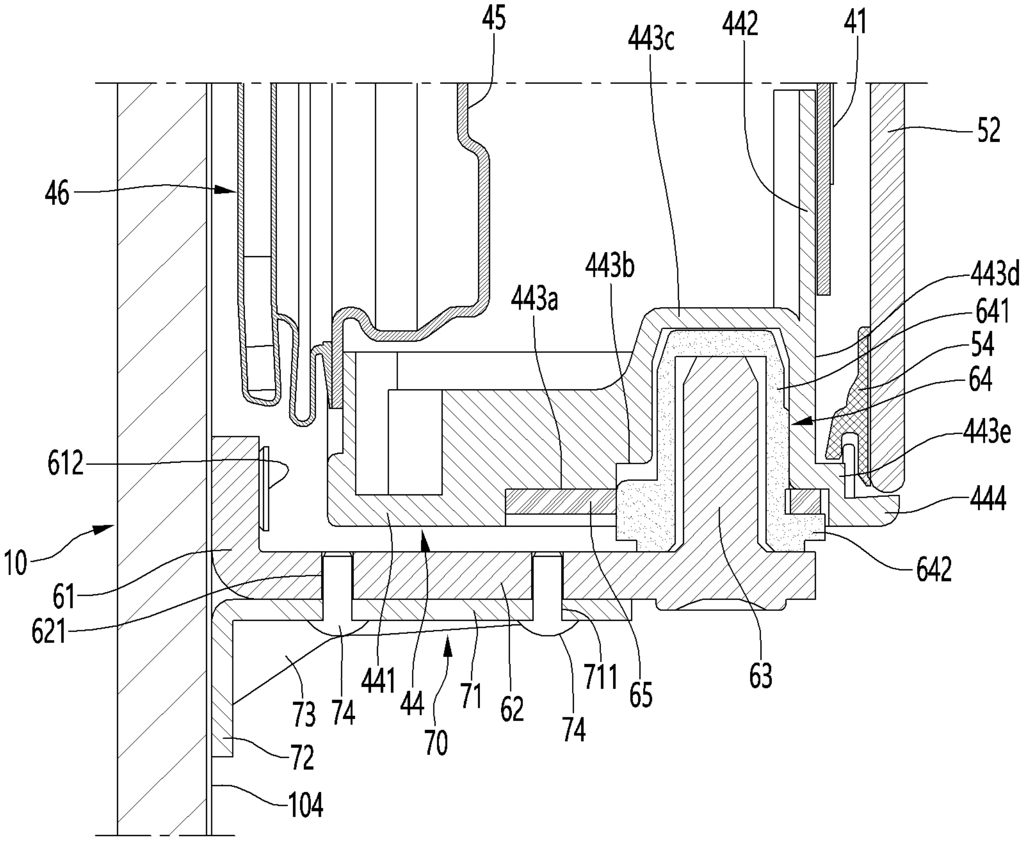
FIG. 23 is a cross-sectional view taken along line XXIII-XIII' of FIG. 2.

FIG. 21 is a perspective view illustrating a lower cab deco which is a component of the door body, FIG. 22 is a partial perspective view illustrating a lower edge coupling structure of the door body, FIG. 18 is a cross-sectional view taken along line XVIII-XVIII' of FIG. 2, and FIG. 23 is a cross-sectional view taken along line XXIII-XIII' of FIG. 2.

As illustrated in the drawing, the lower cap deco 44 may be formed of a plastic material, may form a lower portion of the door body 40, and may form an outer appearance of a lower surface of the door body 40. The lower cap deco 44 may generally include a lower surface 441, a front surface 442, a rear surface 448, and both side surfaces 449.

The front surface 442 may support the lower end of the front plate 41 from the rear. In addition, the both side surfaces 449 may support the lower end of the side frame 45 from the inside. In addition, the rear surface 448 may support the lower end of the door liner 47 from the front.

As such, a closed space may be formed inside by the front plate 41 and the side frame 45 and the door liner 47 coupled to the front surface 442 and both side surfaces 449 and rear surfaces 448 of the lower cap deco 44, and the insulating material 400 may be filled inside the space.

A lower plate coupling part 442*a* supporting the front plate 41 from the rear may be formed on the front surface of the lower cap deco 44. The lower plate coupling part 442*a* may extend from the left end to the right end of the front surface and may protrude slightly forward to support the front plate 41 from the rear. In addition, a plurality of screws penetrating the front plate 41 may be fastened.

A lower support end 445 extending forward may be formed at a lower end of the front surface 442 of the lower cap deco 44. The lower support end 445 may be formed so that the lower surface 441 of the lower cap deco 44 extends past the lower end of the front surface 442 of the lower cap deco 44.

Further, a constraining rib 445*a* protruding upward may be formed at a lower end of the lower support end 445. The constraining rib 445*a* is inserted into the lower bracket 54 and formed to constrain the lower end of the panel assembly 50.

Meanwhile, the lower hinge 60 may be mounted on the lower surface of the lower cap deco 44. The lower hinge 60 rotatably supports the door 20 from below and may be coupled to the front surface of the cabinet 10. In addition, the rotation axis of the lower hinge 60 may be disposed on the same extension line as the rotation axis of the hinge 13.

A lower hinge mounting part 443 on which the lower hinge 60 is mounted may be formed on a lower surface of the lower cap deco 44. The lower hinge mounting part 443 may be formed in the same structure on both left and right sides of the lower cap deco 44, and thus, the lower hinge 60 may be mounted on the lower hinge mounting part 443 on one side according to the rotation direction of the door 20.

Looking in more detail with respect to the structure of the lower hinge mounting part 443, the lower hinge mounting part 443 may include a lower mounting part boss 443*c* into which the lower hinge pin 63 of the lower hinge 60 is inserted. In addition, a lower hinge bush 64 into which the lower hinge pin 63 is inserted may be inserted into the lower mounting part boss 443*c*.

In addition, the lower mounting part boss 443*c* allows the lower hinge pin 63 to be disposed as forward as possible so that the edge of the door 20 can satisfy the set rotation radius R.

To this end, the lower mounting part boss 443*c* contacts the front surface 443*d* of the lower hinge mounting part 443, and the front surface 443*d* of the lower hinge mounting part 443 may protrude forward. In detail, the lower hinge mounting part 443 is located inside the insulating area D1, but the front surface 443*d* of the lower hinge mounting part 443 can be formed to protrude forward, and can protrude to the inside of the panel area D2.

In other words, the lower hinge mounting parts 443 formed on both sides of the lower cap deco 44 may have a structure protruding forward, and it can be said that the front surface of at least the lower hinge mounting part 443 is located at an inside of the panel area D2.

The lower mounting part boss 443*c* contacting the front surface of the lower hinge mounting part 443 may be located more forward, and thus the rotation center of the lower hinge pin 63 may also be located forward within a possible range. In addition, the rotation center of the lower hinge pin 63 may be located at a position where the edge of the lower door 20 satisfies the rotation radius R.

In addition, a lower protrusion part 443*e* protruding further forward may be formed at a lower end of the lower hinge mounting part 443. The lower protrusion part 44*e*3 protrudes from a position corresponding to the first stepped part 443*a* to be described below, and the lower hinge bush 64 and a recessed space of the first stepped part 443*a* to which the hinge bracket 65 are mounted may be secured and the hinge pin 151 of the lower hinge 60 may be positioned more forward.

In detail, the lower hinge mounting part 443 may have a first stepped part 443*a* opened downward. In addition, a hinge bracket 65 through which the lower hinge bush 64 passes may be mounted on the first stepped part 443*a*, and the first stepped part 443*a* may protrude more than a front surface 442 of the lower cap deco 44 and the front surface 442*d* of the lower hinge mounting part 443. Accordingly, the lower hinge mounting part 443 may be supported by the hinge bracket 65, and the lower hinge mounting part 443 may be reinforced.

In particular, the front end of the hinge bracket 65 is disposed between the bush seating part 642 protruding outward from the lower end of the lower hinge bush 64 and the first stepped part 443*a*, and it is possible to distribute the load applied by the self-weight of the door 20, and to reinforce the front end of the lower cabinet 10 in which the hinge pins 151 are disposed close to each other. The lower door 20 may be more stably supported by the lower hinge 60 by the hinge bracket 65.

Meanwhile, a second stepped part 443*b* that is further recessed may be formed in the first stepped part 443*a*. A part of the bush seating part 642 penetrating the hinge bracket 65 may be seated on the second stepped part 443*b*. The bush seating part 642 may have different thicknesses in the first half and the second portion, and the first half of the bush seating part 642 is formed to have a relatively thin thickness and is positioned on the lower surface of the hinge bracket 65 and may be located in an area corresponding to the stepped part 443*a*. In addition, the second portion of the bush seating part 642 may be formed to have a relatively thicker thickness and may pass through the hinge bracket 65 and be seated on the second stepped part 443*b*. Due to the structure of the bush seating part 642 as described above, the lower hinge bush 64 can be stably mounted inside the lower mounting part boss 443*c* without being rotated. In addition, the hinge pin 151 of the lower hinge 60 may be inserted through the opened lower surface of the lower hinge bush 64 to be fixedly mounted to become a rotation shaft through which the door 20 rotates.

Meanwhile, the shape of the front surface 443*d* of the lower hinge mounting part 443 may be formed to correspond to the lower opening 427 formed in the frame front surface 422 of the side frame 42. Accordingly, the protruding front surface 443*d* of the lower hinge mounting part 443 may pass through the lower opening 427 and may be exposed to the panel area D2. To this end, the lower opening 427 formed at the lower end of the frame front surface 422 may be formed in a size and shape corresponding to the front surface 443*d* of the lower hinge mounting part 443.

Due to this structure, the lower hinge mounting part 443 may protrude toward the inside of the panel area D2, and the space that is depressed forward as far as possible within a range that does not interfere when the panel assembly 50 is mounted can be secured, and the lower hinge 60 can be mounted at a position capable of satisfying the rotation radius R of the door 20.

The front surface 443*d* of the mounting part of the lower hinge mounting part 443 may protrude so as not to interfere with the frame front surface 422 of the side frame 42 and may protrude to a position in close contact with the rear surface of the panel assembly 50.

In addition, the side frame 42 may be coupled to the side surface 448 of the lower cap deco 44, and the coupling structure between the side frame 42 and the lower cap deco 44 may be formed so as not to interfere with the circumference of the lower mounting part boss 443*c* in which the lower hinge pin 63 is disposed.

In detail, a frame constraining protrusion 426 may be formed on a side surface of the side frame 42. The frame constraining protrusion 426 may be spaced apart from the front side of the side frame 42 and may protrude along the side surface of the side frame 42. Further, a stepped frame protrusion receiving part 446 may be formed on a side surface of the lower cap deco 44 to receive the frame constraining protrusion 426.

In this case, the frame protrusion receiving part 446 may have a shape protruding into the inside of the lower hinge mounting part 443. In addition, the frame protrusion receiving part 446 may be formed on the circumferential side of the lower mounting part boss 443*c* so as not to interfere with the outer surface of the lower mounting part boss 443*c*. In other words, the frame protrusion receiving part 446 may be positioned at a position that does not interfere with the outer surface of the lower hinge bush 64. Therefore, even if the position where the lower hinge pin 63 is disposed is positioned to the front and side edges as far as possible, it is possible to prevent interference with the mounting structure of the side frame 42.

Meanwhile, a reinforcing rib 447 for reinforcing the strength of the lower mounting part boss 443*c* may be further formed inside the lower cap deco 44. The reinforcing ribs 447 may be formed to connect the outer surface of the lower mounting part boss 443*c* to the rear surface 449 and side surfaces 448 of the lower cap deco, and are disposed in a direction in which a plurality of ribs intersect, and thus a load applied to the lower mounting part boss 443*c* may be distributed, and the strength of the lower mounting part boss 443*c* may be reinforced.

The lower edge area of the door body 40 on which the lower hinge mounting part 443 to which the lower hinge 60 is mounted is formed, and the strength reinforcement may be required by the self-weight of the door 20 and the load of the items received in the door 20.

Particularly, due to the characteristic of the structure in which the rotation shaft of the lower hinge 60 is disposed forward, it is more vulnerable to a load applied downward, and strength reinforcement at the lower edge of the door body 40 may be required.

In detail, a lower screw hole 442*c* for coupling the lower end of the front panel 51 and the side frame 42 may be formed at a side end of the front surface 442 of the lower cap deco 44. A plurality of lower screw holes 442*c* may be formed and may be formed at positions corresponding to the plate hole 414 of the front plate 41 and the frame screw hole 425 of the side frame 42.

Accordingly, the fastening member S penetrating the front plate 41 may be fastened to the lower screw hole 442*c* so that the front plate 41 and the lower cap deco 44 are coupled. In addition, the fastening member S penetrating the plate hole 414 of the frame front surface 422 is fastened to the lower screw hole 442*c* so that the side frame 42 and the lower cap deco 44 can be coupled.

Meanwhile, a plurality of plate holes 414 and frame screw holes 425 may be formed in the front plate 41 and the side frame 42, respectively. In addition, some of the plurality of the plate holes 414 and the frame screw holes 425 may be positioned at positions corresponding to each other. Accordingly, the fastening member S passing through the frame screw hole 425 may be fastened to the plate hole 414, and the front plate 41 and the side frame 42 may be coupled.

In this way, the front plate 41, the side frame 42, and the lower cap deco 44 can be coupled to each other by a plurality of fastening members S. The plurality of fastening members S are concentrated on the lower edge portion of the door body 40 on which the lower hinge 60 is mounted, so that the strength at the corresponding position can be reinforced. In addition, despite the structure in which the front plate 41, the side frame 42, and the lower cap deco 44 are structurally connected to each other and thus the lower hinge pin 63 is disposed at the edge of the front end and the outer end of the door, the required strength of the door 20 can be satisfied. As the fastening member S, for example, screws, bolts, rivets, and the like may be used.

Meanwhile, a lower hinge 60 may be mounted on a lower surface of the lower cap deco 44. The lower hinge 60 may be mounted on the front surface of the cabinet 10. For example, in a case where a barrier 104 that divides the storage space into an upper storage space 102 and a lower storage space 103 is provided, the lower hinge 60 may be mounted on the front surface of the barrier 104.

The lower hinge 60 may include a vertical part 61 fixedly mounted to the cabinet 10 as a whole, a horizontal part 62 extending forward from the vertical part 61, and the lower hinge pin 63.

In addition, the lower hinge 60 may be supported from below by a hinge supporter 70 mounted on the cabinet 10. In addition, a stopper 90 for limiting the rotation angle of the door 20 may be further provided at one side adjacent to the lower hinge 60.

Hereinafter, structures of the lower hinge 60, the hinge supporter 70, and the stopper 90 will be described in more detail with reference to the drawings.

Figure 24:
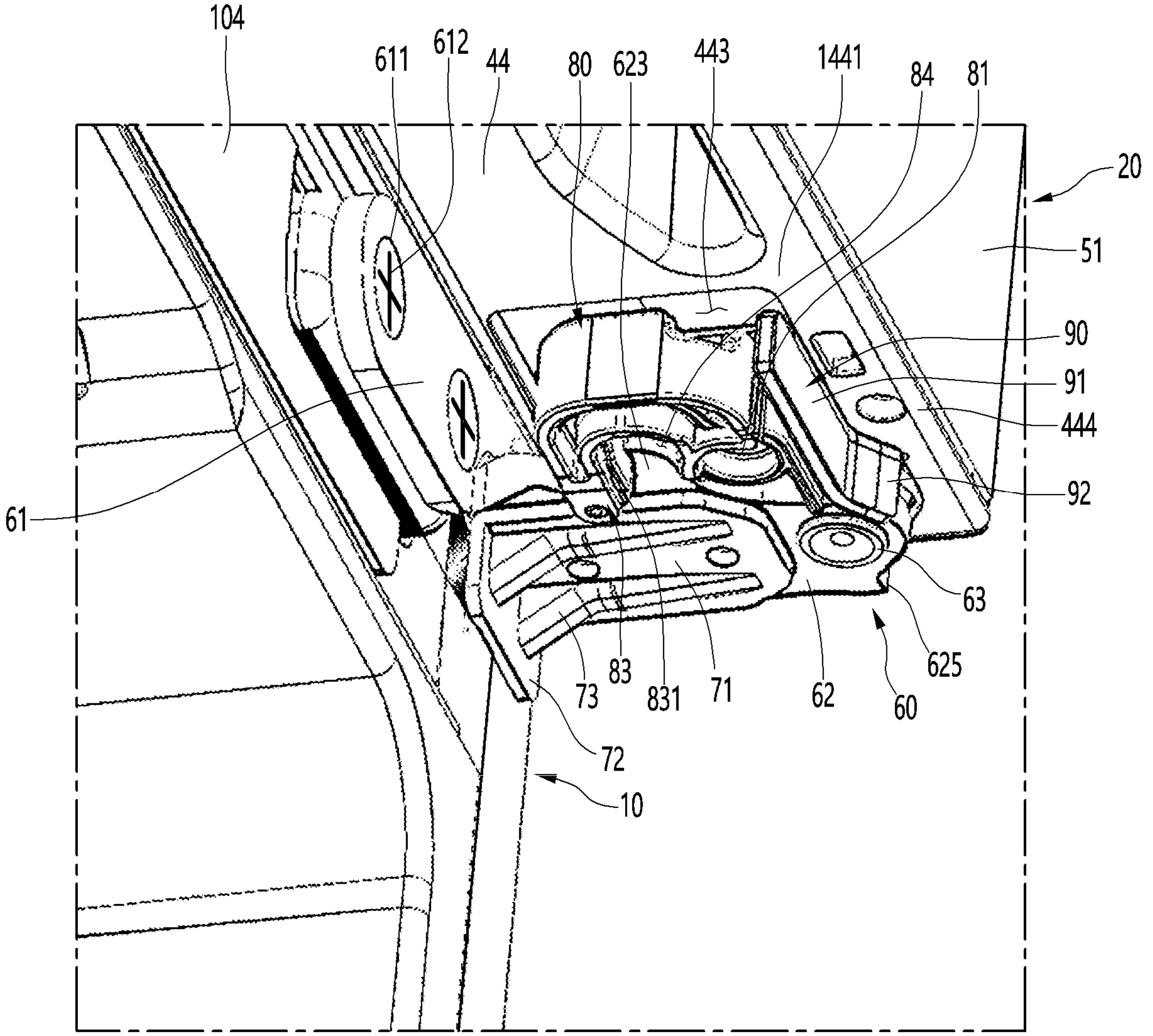
FIG. 24 is a partial perspective view illustrating a state where the door is supported by a lower hinge according to an embodiment of the present disclosure.
Figure 25:
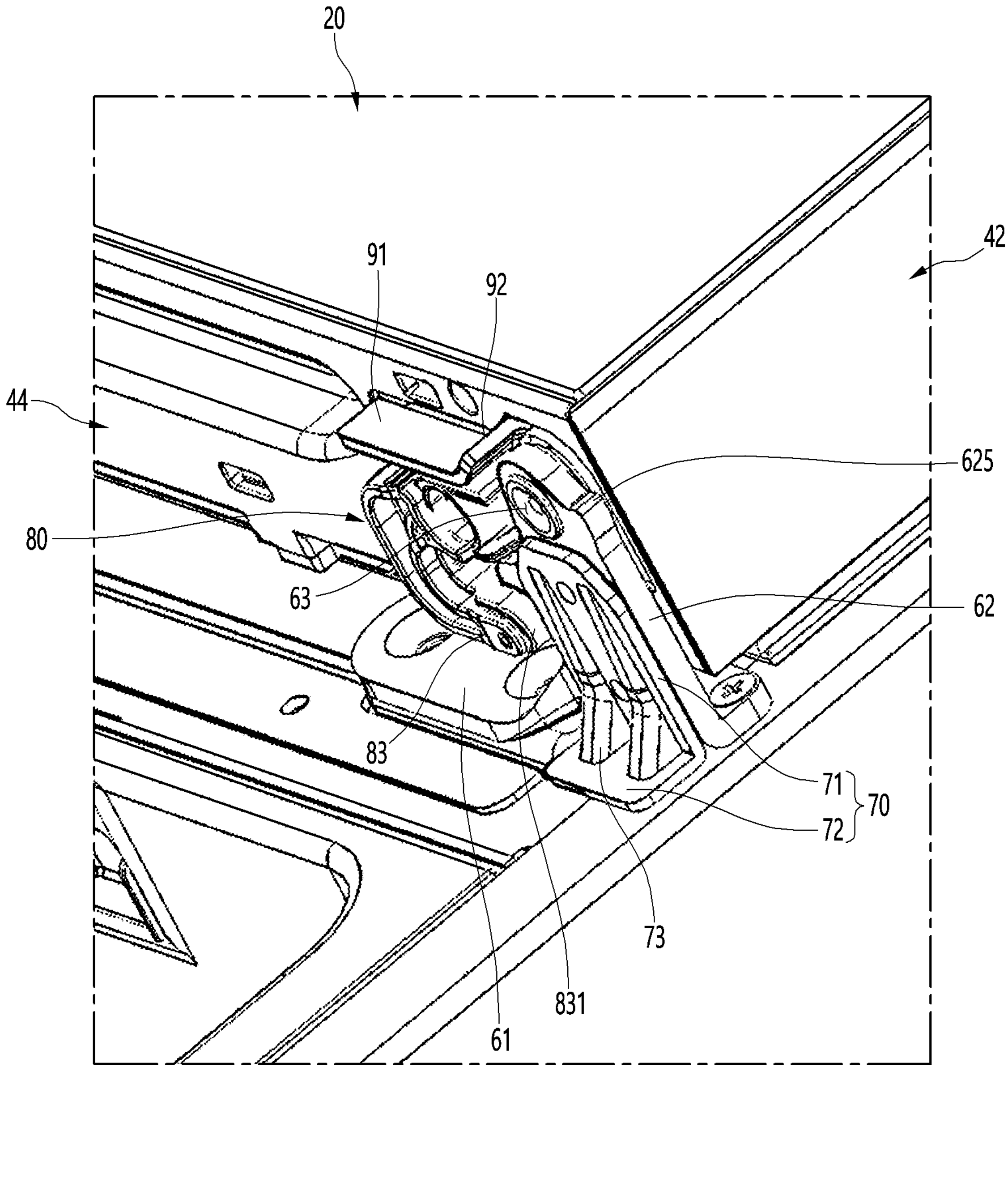
FIG. 25 is a view illustrating a state of the lower hinge in a state where the door is closed.
Figure 26:
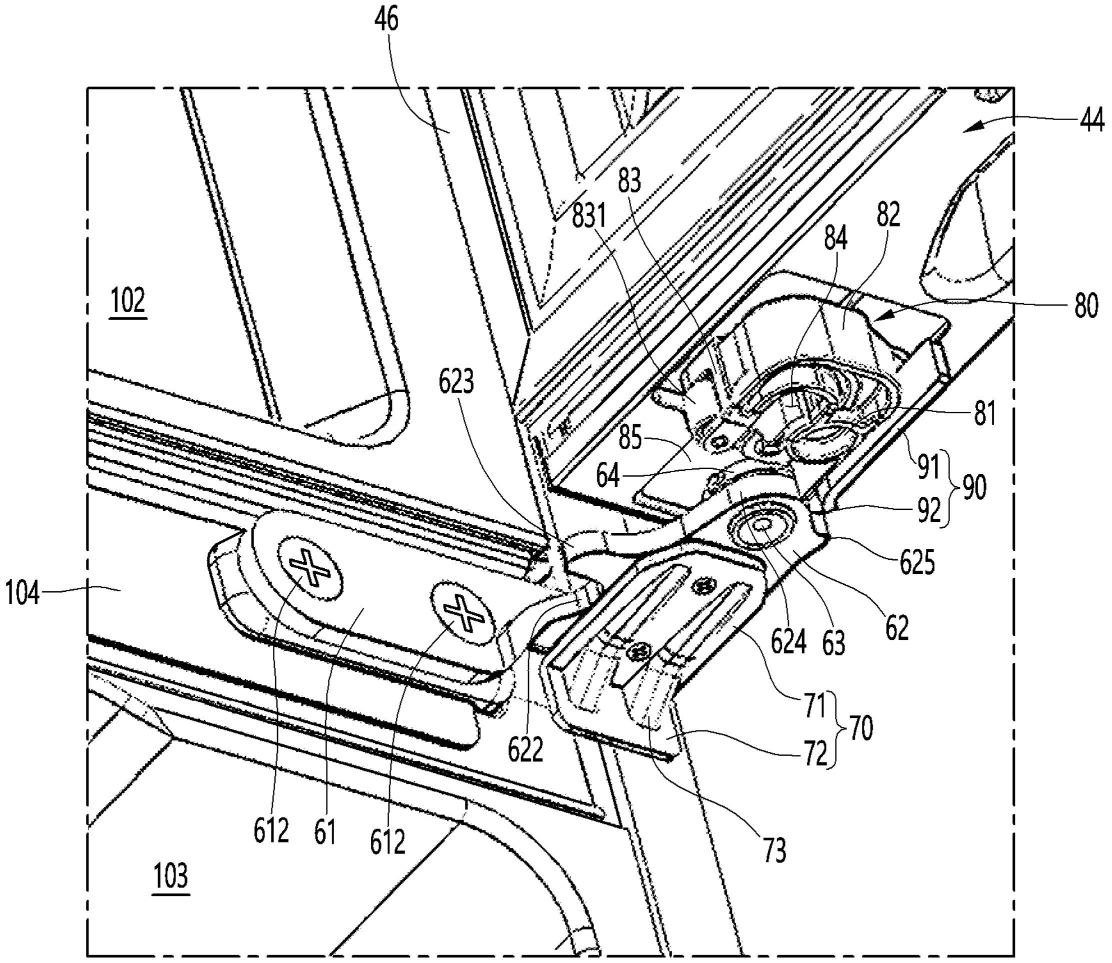
FIG. 26 is a view illustrating the state of the lower hinge in a state where the door is opened by a 90° angle.
Figure 27:
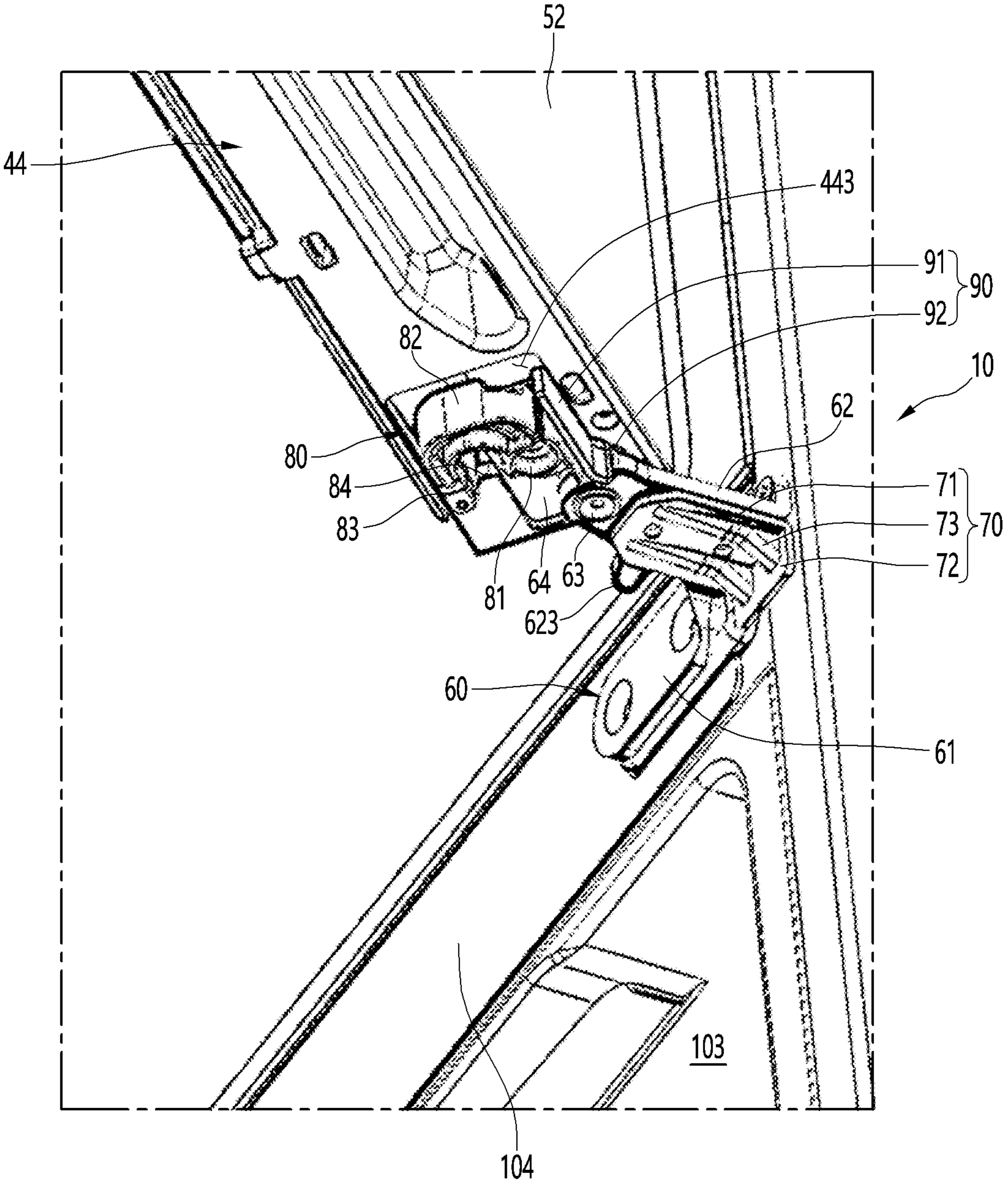
FIG. 27 is a view illustrating a state of the lower hinge in a state where the door is opened by a maximum angle.

FIG. 24 is a partial perspective view illustrating a state where the door is supported by a lower hinge according to an embodiment of the present disclosure, FIG. 25 is a view illustrating a state of the lower hinge in a state where the door is closed, FIG. 26 is a view illustrating the state of the lower hinge in a state where the door is opened by a 90° angle, and FIG. 27 is a view illustrating a state of the lower hinge in a state where the door is opened by a maximum angle.

As illustrated in the drawing, the lower hinge 60 may be formed of a metal material and may be formed by bending to form a vertical part 61 and a horizontal part 62.

The vertical part 61 may be fixed to the front surface of the barrier 104 by a screw 612. In addition, the horizontal part 62 may extend forward by bending the lower end of the vertical part 61 and may extend to the lower hinge mounting part 443 on which the lower mounting part boss 443*c* is formed.

In addition, an outer surface of the horizontal part 62 may be exposed through a side surface of the cabinet 10 and may extend along an extension direction of the side surface of the cabinet 10. In addition, the horizontal part 62 may have a curved structure including a constraining groove 622 and a constraining protrusion 623 therein.

A stop protrusion 625 may protrude from an extended end portion of the outer surface of the horizontal part 62. The stop protrusion 625 may contact the stopper 90 so that the door 20 is not rotated anymore and can be stopped when the door 20 is rotated by a set angle and opened. The stop protrusion 625 may protrude outward at a position corresponding to the side of the lower hinge pin 63.

The constraining groove part 622 and the constraining protrusion part 623 may be configured to come into contact with an opening and closing auxiliary device 80 mounted on a lower surface of the lower cap deco 44 adjacent to the lower hinge 60. The opening and closing auxiliary device 80 may keep the door 20 in a closed state by contacting the constraining groove part 622 and the constraining protrusion part 623 or allow the door 20 to be opened.

In detail, the opening and closing auxiliary device 80 may include an auxiliary device mounting part 81 mounted on the lower surface of the lower cap deco 44, an auxiliary device extension part 82 extending from the auxiliary device mounting part 81, an auxiliary device constraining part 83 that is bent at an end portion of the auxiliary device extension part 82, and a roller 831 mounted on the auxiliary device constraining part 83.

The auxiliary device extension part 82 and the auxiliary device constraining part 83 may be formed to have a predetermined curvature and may form a locking space 84 in which the inside is recessed. In addition, the roller 831 may rotate in contact with the constraining groove part 622 or the constraining protrusion part 623 when the door 20 is closed and when the door 20 is opened and closed. In addition, the auxiliary device extension part 82 and the auxiliary device constraining part 83 may be formed to have elasticity and may be elastically deformed in the process of passing through the constraining protrusion part 623.

As disclosed in FIGS. 24 and 25, in a state where the door 20 is closed, the roller 831 and the end portions of the auxiliary device constraint part 83 are kept inserted into the inside of the constraining groove part 622. Therefore, the door 20 may be constrained to remain a closed state, and the closed state is maintained until the roller 831 and the auxiliary device constraining part 83 exert a force to the extent of being capable of escaping from the constraining groove part 622.

In addition, when the door 20 is pulled and rotated so that the door 20 is opened, the roller 831 and the auxiliary device constraining part 83 escape the constraining groove part 622. At this time, the roller 831 may be located at the end portion of the constraining protrusion part 623, and when the roller 831 is located at the end portion of the constraining protrusion part 623 or passes through the end portion of the constraining protrusion part 623, the auxiliary device extension part 82 and the auxiliary device constraining part 83 are elastically restored and move along the curvature of the outer surface of the constraining protrusion part 623 to assist the open rotation of the door 20.

Conversely, when the door 20 is pushed and rotated so that the door 20 is closed, the roller 831 is moved along the curvature of the outer surface of the constraining protrusion 623 and may be elastically deformed during the movement. In addition, when the roller 831 passes the end portion of the constraining protrusion part 623, the auxiliary device extension part 82 and the auxiliary device constraint part 83 are elastically restored, and the roller 831 and the auxiliary device constraining part 83 is inserted into the constraining groove part 622 to forcibly rotate in the direction in which the door 20 is closed, and eventually the door 20 is closed.

Meanwhile, the supporter 70 for reinforcing the lower hinge 60 may be formed below the lower hinge 60. The supporter 70 may be fixedly mounted on the front surface of the cabinet 10 or the front surface of the barrier 104 and may support the horizontal part 62 from below by being in contact with the horizontal part 62.

The supporter 70 may include a supporter vertical part 72 in contact with the front surface of the barrier 104 and a supporter horizontal part 71 extending forward from an upper end of the supporter vertical part 72. The supporter horizontal part 71 may extend along the horizontal part 62 of the lower hinge 60 and may extend to a position where the lower hinge pin 63 is mounted. In addition, the supporter horizontal part 71 is rigidly coupled to the horizontal part 62 by a screw 74 that is fastened under the horizontal part 71, thereby preventing sagging of the lower hinge 60.

Meanwhile, a supporter reinforcement part 73 may be further formed between the supporter vertical part 72 and the supporter horizontal part 71. A plurality of supporter reinforcement parts 73 may be formed on both left and right sides, and the supporter 70 may be maintained in a shape supporting the lower hinge 60 without being deformed or damaged.

The stopper 90 may protrude downward from the lower surface of the lower cap deco 44. The stopper 90 may be located in front of the opening and closing auxiliary device 80 and may be elongated in a horizontal direction.

In addition, the stopper 90 is formed to protrude downward from a position away from the front end of the lower cap deco 44 to the rear so that a portion exposed to the outside when viewed from the front can be minimized.

In detail, the stopper 90 may include a transverse extension part 91 and a bending part 92. The transverse extension part 91 may be formed to extend in a horizontal direction along the lower cap deco 44 from a rear away from the front end of the lower cap deco 44, and the bending part may be formed to be bent to be inclined or rounded toward the front at the end portion of the transverse extension part 91.

The transverse extension part 91 may at least correspond to the horizontal part 62 or protrude to a slightly lower height. In addition, the transverse extension part 91 may be formed to cover the opening and closing auxiliary device 80 in front of the opening and closing auxiliary device 80.

The bending part 92 may be bent inclined or rounded toward the front as it extends outward from the end portion of the transverse extension part 91. In addition, the extended end portion of the bent portion 92 may also be located at a rear rather than a front end of the lower cap deco 44. In addition, the extended end portion of the bending part 92 may contact the stop protrusion 625 in a state where the door 20 is completely open, and the door 20 may be restricted so that the door 20 is not opened any more.

In this case, the opening angle at which the door 20 is stopped may be set according to the position of the extended end portion of the bending part 92. In order to open the door 20 and pull out the storage member 100 from the inside, the door 20 has to be openable at least 90°, which is the minimum opening angle A1. In addition, the door 20 can also be opened to further rotate within a range that does not interfere with the door 20 according to the position of the furniture, the wall O, or home appliance such as the refrigerator 1' adjacent to the side of the refrigerator 1. For example, the maximum opening angle of the door 20 may be 117°.

Hereinafter, the relationship between the door 20, the cabinet 10, the wall O, and the refrigerator 1' according to the rotational state of the door 20 will be described in more detail with reference to the drawings.

Figure 28:
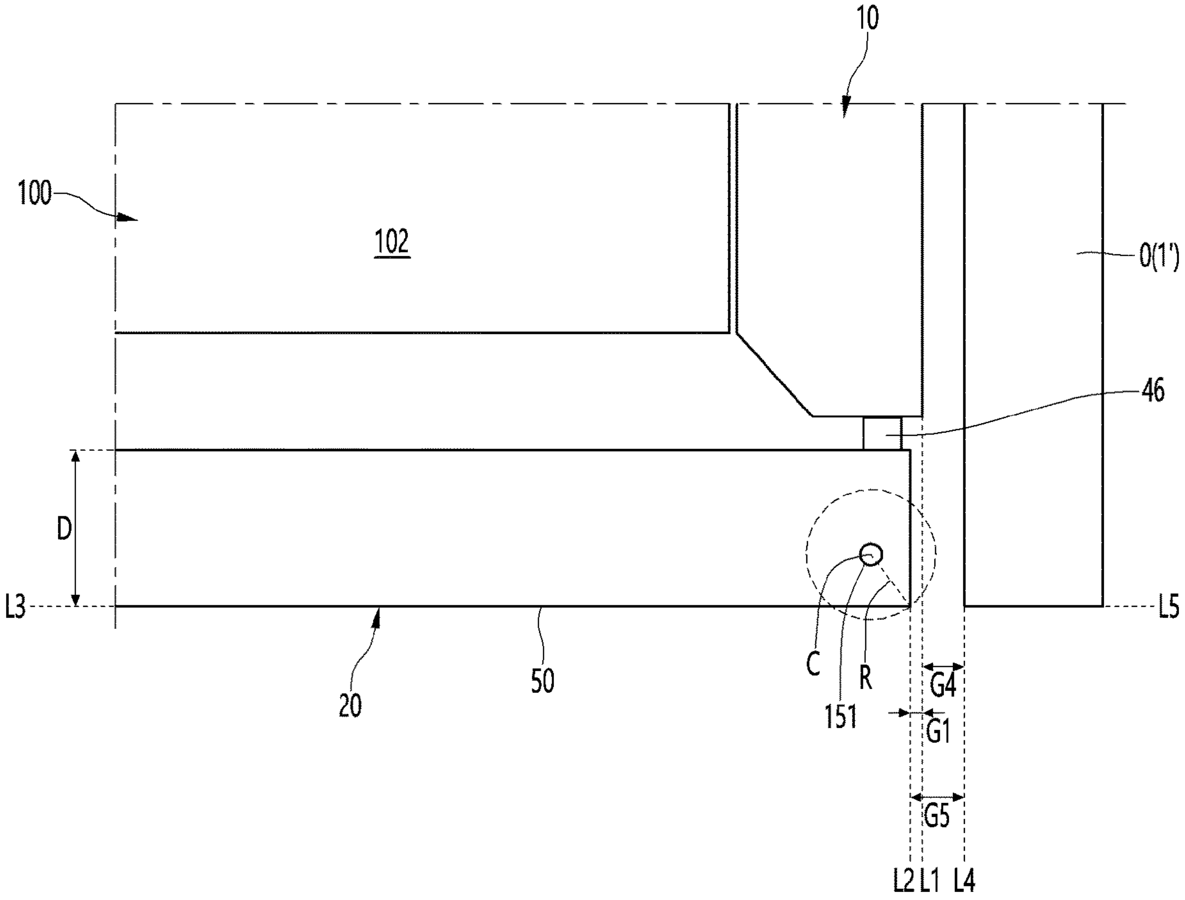
FIG. 28 is a view schematically illustrating a relationship between the door, the cabinet, and the wall in a state where the door is closed.

FIG. 28 is a view schematically illustrating a relationship between the door, the cabinet, and the wall in a state where the door is closed.

As illustrated, the refrigerator 1 may be built-in or installed on a wall to harmonize with other home appliances or furniture. The refrigerator 1 can be installed so that the extension line L3 of the front surface of the door 20 is located on the same line as the extension line L5 of the front surface of the furniture or wall O, and home appliances such as the refrigerator 1'. Accordingly, the refrigerator 1 may be harmonized with the neighboring furniture, the wall O, or home appliances such as the refrigerator 1' and may provide a disposition arrangement state having a sense of unity.

In addition, in the state where the refrigerator 1 is installed, the furniture, the wall O, or home appliances such as the refrigerator 1' adjacent to the cabinet 10 may be spaced apart from each other by a set distance G4. The set distance G4 may be such that a gap is not unnaturally visible when the refrigerator 1 is disposed and may be set in consideration of air circulation in the machine room of the refrigerator 1, a dimensional change according to a temperature difference, an assembly tolerance, or the like. For example, the set distance G4 may be 13 mm to 15 mm.

In addition, when the door 20 is closed while the refrigerator 1 is installed, the extension line L2 on the side surface of the door 20 and the extension line L1 on the side surface of the cabinet may be spaced apart by a set distance G1. The set distance G1 may be approximately 5 mm to 6 mm as described above, and the side surface of the door 20 may be further spaced apart from the furniture, the wall O, or home appliances such as the refrigerator 1', and, in this case, the set distance G5 may be approximately 18 mm to 21 mm.

Of course, the distance G5 between the side surface of the door 20 and the furniture, the wall O, or home appliance such as refrigerator 1' is relatively far, but when viewed from the front, since a clearance may be recognized by the distance G4 between the cabinet 10 and the furniture, the wall O, or home appliance such as refrigerator 1', the refrigerator 1 disposed on the wall may be viewed as maintaining an appropriate distance.

Further, in such a state, the hinge pin 151 may be disposed at the front and side edges so as to be as close as possible to a region in which the panel assembly 50 is mounted. In this case, the position of the hinge pin 151 may be positioned so that the rotation radius R of the edge of the door 20 may be a set radius of 20.5 mm.

Therefore, even if the door 20 is rotated for opening and closing, the rotation radius R of the edge of the door 20 corresponds to the side position of the cabinet 10 or even if it protrudes slightly, the adjacent furniture or wall O, the edge of the door 20 is possible to ensure rotation without interfering with the furniture, the wall O, or home appliance such as refrigerator 1'.

Figure 29:
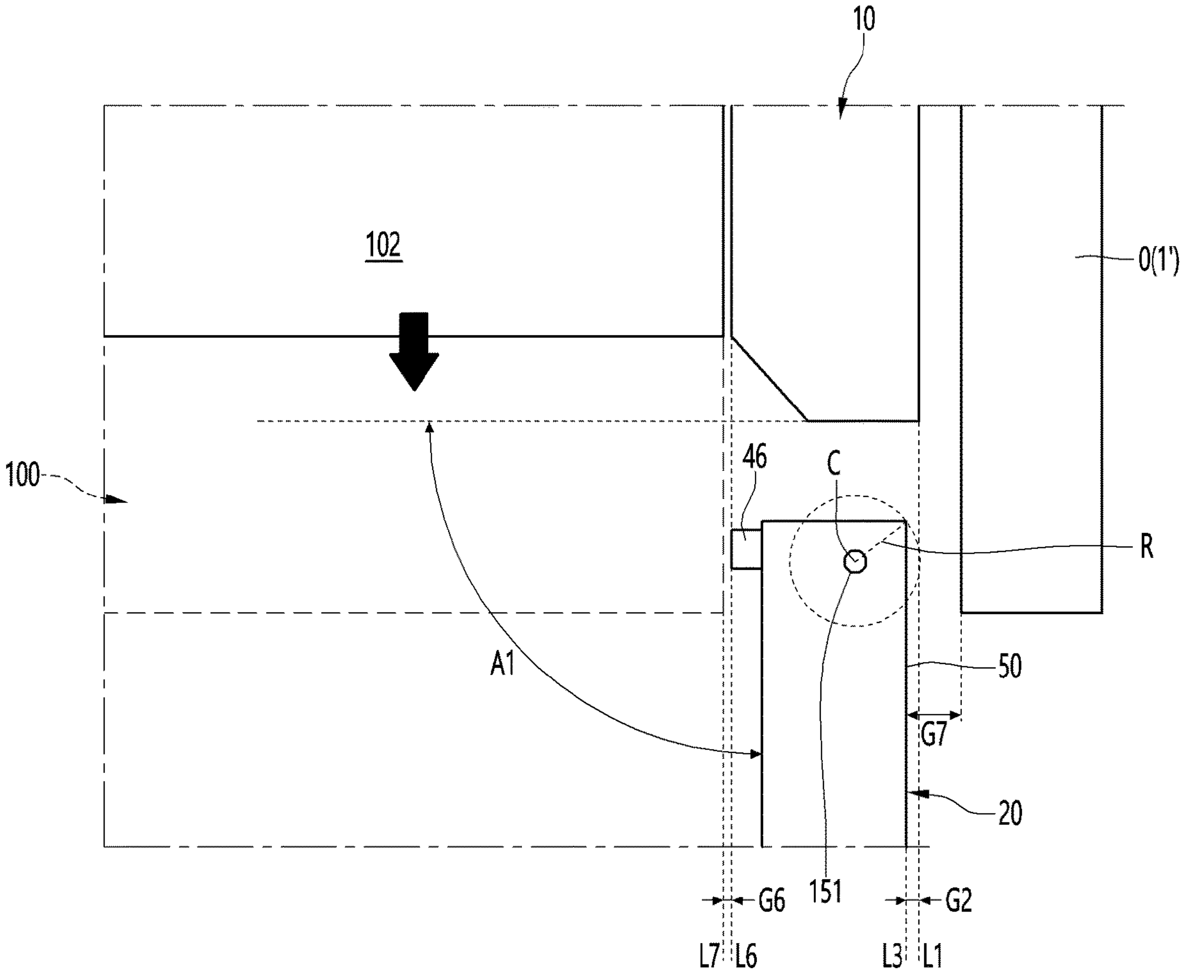
FIG. 29 is a view schematically illustrating a relationship between the door, the cabinet, and the wall in a state where the door is opened by a 90° angle.

FIG. 29 is a view schematically illustrating a relationship between the door, the cabinet, and the wall in a state where the door is opened by a 90° angle.

As illustrated in the drawings, the door 20 may be corrected for opening by a minimum opening angle A1 that can ensure the pulling-out of the storage member 100 such as a drawer or a shelf in the refrigerator. For example, the minimum opening angle A1 may be a 90° angle. In a state where the door 20 is opened at the minimum opening angle, the door does not interfere with the adjacent furniture, the wall O, or home appliance such as refrigerator 1', and at the same time, the storage member 100, such as a drawer or a shelf, can be freely pulled out.

In the state rotated by the minimum opening angle A1, between the extension line L1 of the side surface of the cabinet 10 and the extension line L3 of the front surface of the door 20 may be spaced apart by a set distance G2, and a side surface of the cabinet 10 may protrude further outward. Accordingly, the door 20 does not collide with the adjacent furniture, the wall O, or home appliance such as refrigerator 1' in such a state or in the process of being opened until such a state is reached.

In addition, in a state where the door 20 is rotated by a minimum opening angle A1, the gasket 46 may protrude most from the inner surface of the door 20. Therefore, if the distance between the extension line L6 of the protruding end portion of the gasket 46 and the extension line L7 on the outer surface of the storage member 100 can be spaced apart by a set distance G6, pulling-in and pulling-out of the storage member 100 can be ensured without interfering with the door 20 and the gasket 46. The set distance G6 may be 0.7 mm. Of course, even when the door is rotated more than a 90° angle, the pulling-in and pulling-out of the storage member 100 may be ensured.

In a state where the door 20 is rotated by a minimum opening angle A1, the distance between an extension line L3 of the front surface of the door 20 and an extension line L4 of the furniture, the wall O, or home appliance such as refrigerator 1' can be spaced apart by a set gap G7. For example, the set interval G7 may be 14.4 mm to 16.4 mm. Accordingly, the door 20 can secure a gap that can be further opened.

Figure 30:
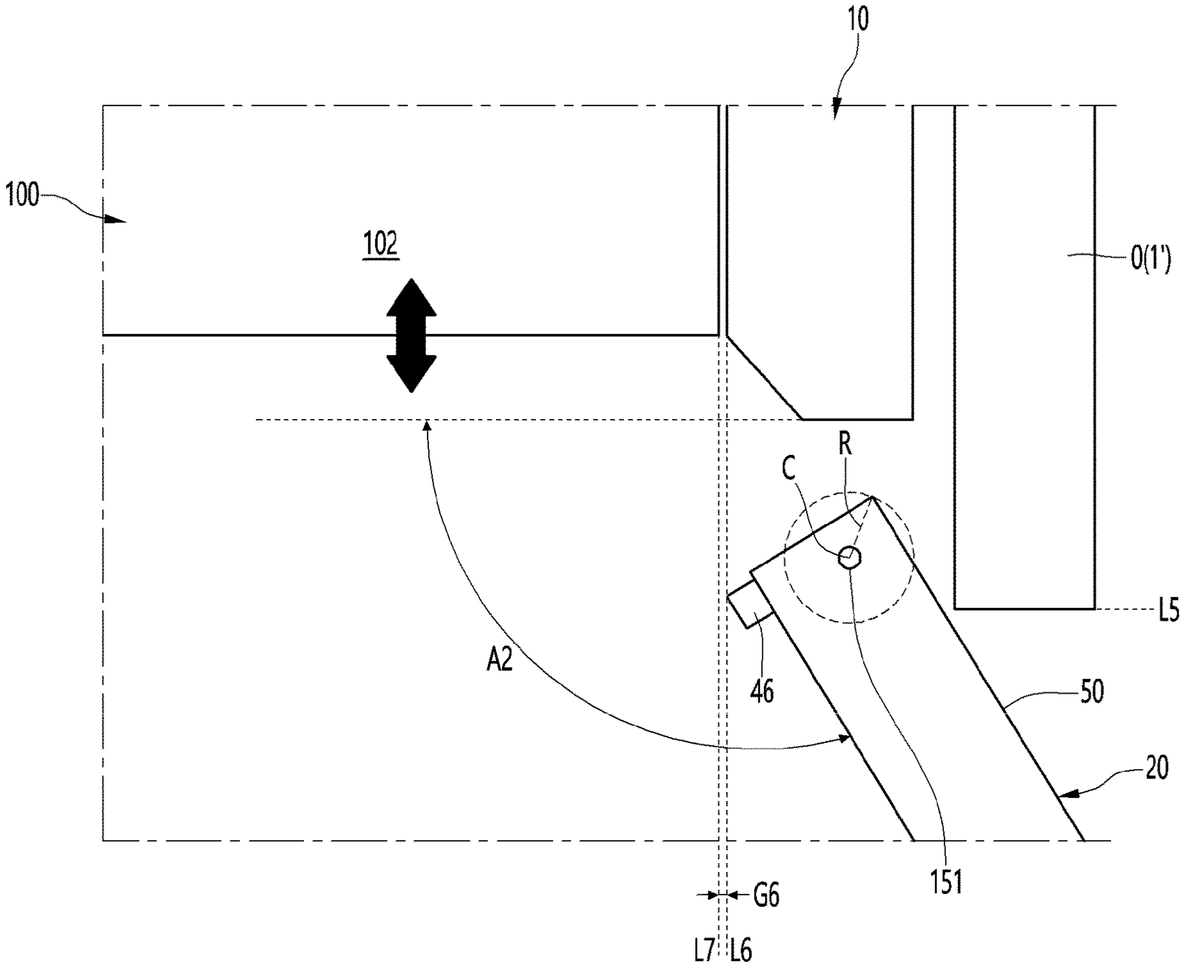
FIG. 30 is a view schematically illustrating a relationship between the door, the cabinet, and the wall in a state where the door is opened by a maximum angle.

FIG. 30 is a view schematically illustrating a relationship between the door, the cabinet, and the wall in a state where the door is opened by a maximum angle.

As illustrated in the drawing, in a case where an extension line L5 of a protruding end portion of the adjacent furniture, wall O, or home appliance such as refrigerator 1' corresponds to the extension line L3 of the front surface of the door 20 in a state where the door 20 is closed, the door can be further opened by a sufficient angle.

As an example, the maximum opening angle A2 in which the door 20 does not collide with the adjacent furniture, wall O, or home appliance such as refrigerator 1' may be approximately 117°. Of course, in a case where the front end of the adjacent furniture, wall O, or home appliance such as refrigerator 1' protrudes more than the extension line L5 as illustrated in FIG. 30, the maximum opening angle of the door 20 may be smaller. Of course, the minimum opening angle A1 of the door can be guaranteed to be 90° regardless of the protruding distance of the adjacent furniture, wall O, or home appliance such as refrigerator 1', and the pulling-in and pulling-out of the storage member 100 in the refrigerator can also be guaranteed.

Meanwhile, the structure of the door 20 according to the embodiment of the present disclosure can be applied equally to the doors 20' and 30' that open and close one storage space from both sides, such as the refrigerator 1' on the left side of FIG. 1. It will be applicable to all refrigerator doors that are opened and closed in a rotating manner.

In the refrigerator according to the proposed embodiment, the following effects can be expected.

A refrigerator according to an embodiment of the present disclosure has a structure capable of minimizing a rotation radius of the door edge by maximally moving the rotation axis of the door to the front and side edges.

Therefore, even when the refrigerator is continuously installed by being attached to a built-in furniture or other home appliance, there is an advantage of preventing the door from colliding with the neighboring furniture or other home appliance when the door is opened.

In particular, by not using a hinge of a multi-link structure and preventing interference with neighboring furniture, refrigerators, or the like through the movement of the hinge pin, it is possible to expect an effect of reducing manufacturing cost thereof and increasing productivity thereof.

In addition, since the hinge has a hinge pin-type coupling structure, the door can be opened with a relatively small force during the opening and closing manipulation of the door, thereby improving the convenience of the opening and closing manipulation of the door.

In addition, since the hinge has a hinge pin-type coupling structure, the distance between the cabinet and the door does not relatively increase during the opening and closing process of the door compared to the hinge of the multi-link structure, and thus there is an advantage of remarkably reducing the possibility that the user's body may be caught or a safety accident may occur.

In the process of opening the door by an angle at which the storage member can be pulled in and out, it is possible to ensure that there is no interference with furniture, walls, home appliances such as refrigerators, or the like adjacent to the cabinet, to the degree to which the rotation radius of the door edge corresponds to the side surface of the cabinet or protrudes finely therefrom, and thus there is an advantage that the refrigerator can be installed in a built-in method or a continuous disposition method in various environments.

In particular, the front surface of the door is formed in a flat shape, so that the same plane can be realized with neighboring furniture, walls, home appliances such as refrigerators, or the like, and even when the front surface of the door is configured as a flat surface, it is possible to dispose the hinge pin as close as possible to the front edge side. Accordingly, there is an advantage in that the environment in which the refrigerator is installed can be improved and the refrigerator is disposed in harmony with neighboring components.

In addition, a detachable panel assembly is disposed on the front surface of the door, and the hinge pin can be disposed at the front and outer edges as much as possible even in a state where a disposition space for the panel assembly is secured. Accordingly, there is an advantage in that various outer appearances can be produced on the refrigerator in a built-in environment or in an environment in which refrigerators are continuously disposed.

In addition, the hinge mounting part on which the hinge is mounted is disposed so as to protrude to the panel region in which the panel assembly is disposed, and thus the hinge pin can be disposed as far forward as possible without increasing the thickness of the door.

As described above, the strength of the portion where the hinge is mounted may be weakened due to the front disposition of the hinge pin, but there is an advantage that the cap deco, the front panel, and the side frame are combined with each other at a position adjacent to the hinge mounting part to be capable of reinforcing the weak portion. In addition, there is an advantage of preventing the hinge and the hinge mounting part from being damaged even in a situation in which a load is applied to the door or the door is repeatedly opened and closed due to the reinforcement of strength at a portion adjacent to the hinge mounting part.

In addition, the diameter of the hinge pin can be minimized by allowing a part of the electric wire directed to the door to pass through the hinge pin of the hinge and the rest of the electric wire passing through the upper surface of the hinge mounting part. By making the diameter of the hinge pin smaller, the hinge pin is easier to be disposed toward the front edge than the hinge mounting portion, and thus there is an advantage of being capable of minimizing the rotation radius of the door edge and preventing interference between the door and neighboring components.

In addition, in a state where the door is closed, the side surface of the door is positioned somewhat inside the side surface of the cabinet, and thus there is an advantage that the rotation radius of the door edge can be minimized from protruding outside the cabinet during the rotation of the door and interference between the door and neighboring components can be more prevented.

In addition, the hinge mounting part on which the hinge is mounted is located on the side surface of the door and is located at a position spaced apart from the upper end, so that the height of the door can be the same even when it is combined with a cabinet having various heights, and accordingly, in a case where a plurality of refrigerators are continuously disposed, it is expected that the outer appearance is integrated and improved.

What is claimed is:

1. A refrigerator comprising:

a cabinet that defines a storage space;

a door configured to open and close at least a portion of the storage space, the door comprising:

a door body filled with an insulating material, and a panel assembly that is disposed at a front surface of the door body and defines a front outer appearance of the door; and an upper hinge that rotatably connects the door to the cabinet, the upper hinge comprising a cabinet mounting part disposed at the cabinet and a hinge pin that is disposed at the door and defines a rotation axis of the door, wherein the door body defines:

a hinge mounting part that is recessed into the door body and receives the upper hinge, the upper hinge being spaced apart from an upper end of the door body, a pin mounting hole that is disposed at a lower surface of the hinge mounting part and receives the hinge pin, and an upper opening that is disposed at an upper surface of the hinge mounting part and receives an electric wire extending into the door, wherein the hinge mounting part is recessed from a first surface of the door body, and wherein the door body further comprises:

an electric wire guide part that is recessed from a second surface opposite to the first surface, the electric wire guide part being in communication with the upper opening, and a sealing cap that covers the electric wire guide part.

2. The refrigerator of claim 1, wherein a diameter of the upper opening is larger than a diameter of the hinge pin.

3. The refrigerator of claim 2, wherein the hinge pin has a tube shape and receives another electric wire that is inserted into the door.

4. The refrigerator of claim 3, wherein the upper opening and the hinge pin are disposed along an extension line and face each other.

5. The refrigerator of claim 3, wherein the diameter of the hinge pin is 8 mm.

6. The refrigerator of claim 2, further comprising:

a hinge cover that is disposed vertically above the upper hinge and covers the upper hinge, wherein the hinge cover defines an electric wire hole at an upper surface thereof, the electric wire hole facing the upper opening and receiving the electric wire passing through the upper opening.

7. The refrigerator of claim 1, wherein the door body further comprises:

a mounting part boss that is disposed in the hinge mounting part and extends downward, the mounting part boss having a hollow interior; and a hinge bush that is disposed in the hollow interior of the mounting part boss and receives the hinge pin.

8. The refrigerator of claim 1, wherein the hinge mounting part comprises:

a rear opening that is opened toward a rear side of the door body; and a side opening that is opened toward a lateral side of the door body.

9. The refrigerator of claim 8, wherein the hinge pin passes through an edge region of the lower surface of the hinge mounting part, the edge region being disposed between a front surface of the hinge mounting part and the side opening of the hinge mounting part.

10. A refrigerator comprising:

a cabinet that defines a storage space;

a door configured to open and close at least a portion of the storage space, the door comprising:

a door body filled with an insulating material, and a panel assembly that is disposed at a front surface of the door body and defines a front outer appearance of the door; and an upper hinge that rotatably connects the door to the cabinet, the upper hinge comprising a cabinet mounting part disposed at the cabinet and a hinge pin that is disposed at the door and defines a rotation axis of the door, wherein the door body defines:

a hinge mounting part that is recessed into the door body and receives the upper hinge, the upper hinge being spaced apart from an upper end of the door body, a pin mounting hole that is disposed at a lower surface of the hinge mounting part and receives the hinge pin, and an upper opening that is disposed at an upper surface of the hinge mounting part and receives an electric wire extending into the door, wherein the door body comprises:

a front plate that defines the front surface of the door body, a door liner that is spaced apart from the front plate and defines a rear surface of the door, an upper cap deco that defines an upper surface of the door, the upper cap deco comprising the hinge mounting part, a lower cap deco that defines a lower surface of the door and is coupled with a lower hinge, and side frames that define lateral side surfaces of the door and connect the upper cap deco to the lower cap deco, wherein the insulating material is provided in a closed space defined by the front plate, the door liner, the upper cap deco, the lower cap deco, and the side frames, wherein each of the side frames comprises:

a frame side surface that defines one of the lateral side surfaces of the door, and a frame front surface that extends from the frame side surface and is coupled to the front plate and the upper cap deco, the frame front surface defining a front opening that receives a front surface of the hinge mounting part, and wherein the front surface of the hinge mounting part passes through the front opening and is in contact with the front plate.

11. The refrigerator of claim 10, wherein the hinge mounting part is disposed vertically below and spaced apart from an upper end of the upper cap deco, the hinge mounting part being opened to a rear surface of the upper cap deco and a lateral side surface of the upper cap deco.

12. The refrigerator of claim 11, wherein the hinge mounting part is one of a plurality of hinge mounting parts that are defined at lateral side ends of the upper cap deco, respectively, and wherein the upper hinge is mounted to one of the plurality of hinge mounting parts.

13. The refrigerator of claim 10, wherein the upper cap deco, the lower cap deco, and the side frames extend forward and define a panel area receiving the panel assembly, and wherein the front surface of the hinge mounting part protrudes toward the panel assembly.

14. The refrigerator of claim 10, wherein the hinge mounting part has a side opening that is opened toward one of the lateral side surfaces of the door, and wherein the frame side surface defines a frame side opening that exposes the side opening of the hinge mounting part to the one of the lateral side surfaces of the door.

15. The refrigerator of claim 10, wherein the door body further comprises a fastening member that is fastened to an upper portion of the hinge mounting part and passes through one of the side frames, the upper cap deco, and the front plate.

16. A refrigerator comprising:

a cabinet that defines a storage space;

a door configured to open and close at least a portion of the storage space, the door comprising:

a door body filled with an insulating material, and a panel assembly that is disposed at a front surface of the door body and defines a front outer appearance of the door; and an upper hinge that rotatably connects the door to the cabinet, the upper hinge comprising a cabinet mounting part disposed at the cabinet and a hinge pin that is disposed at the door and defines a rotation axis of the door, wherein the door body defines:

a hinge mounting part that is recessed into the door body and receives the upper hinge, the upper hinge being spaced apart from an upper end of the door body, a pin mounting hole that is disposed at a lower surface of the hinge mounting part and receives the hinge pin, and an upper opening that is disposed at an upper surface of the hinge mounting part and receives an electric wire extending into the door, wherein the upper hinge further comprises an extension part that extends forward from the cabinet mounting part, the extension part being curved toward a side edge of the hinge mounting part from a position protruding forward relative to a front surface of the cabinet, wherein the hinge pin is disposed at an end part of the extension part, and wherein the upper opening and the hinge pin are disposed along an extension line and face each other.

17. The refrigerator of claim 16, wherein the upper hinge further comprises a reinforcing part that laterally protrudes from the extension part and connects a side end of the extension part to a front end of the cabinet mounting part, the front end of the cabinet mounting part protruding forward relative to the front surface of the cabinet.

18. The refrigerator of claim 16, wherein the extension part comprises a reinforcing protrusion that protrudes from an upper surface of the extension part and extends along a center region of the extension part toward the side edge of the hinge mounting part.

* * * * *